United States Patent
Jung et al.

(10) Patent No.: US 11,019,410 B2
(45) Date of Patent: May 25, 2021

(54) METHOD AND APPARATUS FOR PROVIDING CONTENTS CONTROLLED OR SYNTHESIZED BASED ON INTERACTION OF USER

(71) Applicant: NAVER WEBTOON Ltd., Seongnam-si (KR)

(72) Inventors: Jin Jung, Seongnam-si (KR); Seung-hun Lee, Seongnam-si (KR); Yeojung Kim, Seongnam-si (KR); Changgeun Song, Seongnam-si (KR); SeungTaek Lim, Seongnam-si (KR); Sang Hyeon Kim, Seongnam-si (KR); Kyeongryeol Park, Seongnam-si (KR); Hyeong Gyu Kim, Seongnam-si (KR); Sang Min Park, Seongnam-si (KR); Hee Jae Ahn, Seongnam-si (KR); Kain Choi, Seongnam-si (KR); Young-Chae Lim, Seongnam-si (KR); Ji Ung Han, Seongnam-si (KR)

(73) Assignee: NAVER WEBTOON Ltd., Seongnam-si (KR)

( * ) Notice: Subject to any disclaimer, the term of this patent is extended or adjusted under 35 U.S.C. 154(b) by 0 days.

(21) Appl. No.: 16/213,620

(22) Filed: Dec. 7, 2018

(65) Prior Publication Data

US 2019/0182563 A1 Jun. 13, 2019

(30) Foreign Application Priority Data

Dec. 8, 2017 (KR) .................... 10-2017-0168638

(51) Int. Cl.
*H04N 21/8545* (2011.01)
*G06F 3/0488* (2013.01)
(Continued)

(52) U.S. Cl.
CPC ....... *H04N 21/8545* (2013.01); *G06F 3/0485* (2013.01); *G06F 3/04842* (2013.01);
(Continued)

(58) Field of Classification Search
CPC ............ H04N 21/8545; G06F 3/04883; G06F 3/04842; G06F 3/0485; G06F 3/167
See application file for complete search history.

(56) References Cited

U.S. PATENT DOCUMENTS

| | | | |
|---|---|---|---|
| 2014/0055607 A1* | 2/2014 | Chen | A63F 13/655 348/143 |
| 2016/0042251 A1* | 2/2016 | Cordova-Diba | G06K 9/4604 382/180 |

(Continued)

FOREIGN PATENT DOCUMENTS

| | | |
|---|---|---|
| CN | 105745938 A | 7/2016 |
| JP | 2017138912 A | 8/2017 |
| KR | 1020110123393 A | 11/2011 |

OTHER PUBLICATIONS

Chinese Office Action dated May 20, 2020 by the Chinese Patent Office corresponding to Chinese patent application No. 201810886244.2.

*Primary Examiner* — Yassin Alata
(74) *Attorney, Agent, or Firm* — Greer, Burns & Crain, Ltd.

(57) ABSTRACT

Disclosed is a method and apparatus that may provide predetermined partial content of content provided from a content providing server to a user terminal by controlling the partial content based on an interaction of a user or synthesizing new content with the partial content, and by displaying the controlled content or the synthesized content.

18 Claims, 27 Drawing Sheets

(51) Int. Cl.
*G06K 9/00* (2006.01)
*G06F 3/0484* (2013.01)
*G06F 3/0485* (2013.01)
*G06F 3/16* (2006.01)
*G06T 11/60* (2006.01)

(52) U.S. Cl.
CPC .......... *G06F 3/04883* (2013.01); *G06F 3/167* (2013.01); *G06K 9/00248* (2013.01); *G06T 11/60* (2013.01); *G06T 2200/24* (2013.01)

(56) References Cited

U.S. PATENT DOCUMENTS

| | | | |
|---|---|---|---|
| 2016/0275988 A1* | 9/2016 | Kim | G11B 27/34 |
| 2017/0076362 A1* | 3/2017 | Joyner | G06Q 30/0643 |
| 2017/0237693 A1* | 8/2017 | Shelkovin | H04L 51/24 |
| | | | 709/206 |

* cited by examiner

<Task: touch>

<Guide information>

METHOD AND APPARATUS FOR PROVIDING CONTENTS CONTROLLED OR SYNTHESIZED BASED ON INTERACTION OF USER

CROSS-REFERENCE TO RELATED APPLICATION(S)

This application claims the benefit under 35 U.S.C. § 119 to Korean Patent Application No. 10-2017-0168638 filed on Dec. 8, 2017, in the Korean Intellectual Property Office (KIPO), the entire contents of which are incorporated herein by reference.

BACKGROUND OF THE INVENTION

Field of Invention

One or more example embodiments relate to a method and apparatus for providing content, and more particularly, to a method and apparatus that may provide content controlled or synthesized based on an interaction of a user, the content including a plurality of cuts having a semantic correlation when the plurality of cuts are sequentially displayed.

Description of Related Art

Currently, there is increasing interest in a webtoon content providing service that provides contents, for example, cartoons online. The webtoon contents represent personages, animals, and objects as cartoon characters, and provide readers with readings containing humor, satire, or a desired plot through lines or conversations.

A reader may view desired webtoon content by scrolling the webtoon content. The webtoon content may include a plurality of cuts, and the reader may view the webtoon content by sequentially verifying the plurality of cuts through scrolling.

However, such webtoon content may be unilaterally provided from a content provider to a reader. The reader may simply browse through the provided webtoon content through scrolling. The reader may not synthesize new content with the webtoon content or interact with a character included in the webtoon content.

Accordingly, there is a need for a method and apparatus that may provide content controlled or synthesized based on an interaction of a user in response to the user browsing through, that is, viewing content, for example, webtoon content.

Korean Patent Publication No. 10-2011-0123393 (published on Nov. 15, 2011) discloses technology for providing a cartoon in a mobile digital content format through direct transactions online.

The aforementioned description is provided to help the understanding only and may include contents that are not in the related art and may not include contents that the related art may provide to one of ordinary skill in the art.

BRIEF SUMMARY OF THE INVENTION

One or more example embodiments provide a method and apparatus that may provide predetermined partial content of content provided from a content providing server to a user terminal by controlling the partial content based on an interaction of a user or by synthesizing new content with the partial content.

One or more example embodiments also provide a method and apparatus that may detect an interaction of a user and may synthesize new content with a predetermined cut of content including a plurality of cuts or may control the content including the predetermined cut in response to a task associated with the predetermined cut when providing the predetermined cut to a user terminal.

According to an aspect of at least one example embodiment, there is provided a content providing method of a user terminal, the method including controlling partial content of first content based on an interaction of a user through the user terminal or synthesizing second content created based on the interaction of the user with the partial content, in response to providing the partial content of the first content to the user terminal, the first content being provided from a content providing server; and displaying the controlled partial content or composite content in which the second content is synthesized.

The first content may be content that includes a plurality of cuts having a semantic correlation when the plurality of cuts is sequentially displayed and each of the plurality of cuts may include at least one layer.

The partial content may be a predetermined cut that allows control or synthesizing of the second content based on the interaction of the user among the plurality of cuts.

The plurality of cuts may be sequentially displayed through scrolling of the user terminal.

A point in time at which the partial content is provided to the user terminal may be a point in time at which the predetermined cut starts to be displayed at a lower end of a screen of the user terminal.

A subsequent cut of the first content may be displayed from an upper end of the screen after the controlled partial content or the composite content in which the second content is synthesized corresponding to the predetermined cut is displayed.

The controlled partial content or the composite content in which the second content is synthesized may be displayed as a full screen on a screen of the user terminal.

At least a portion of the controlled partial content or the composite content may be stored in the user terminal or the content providing server.

The partial content may include a panoramic image or a 360-degree image.

The controlling of the partial content or the synthesizing of the second content may include controlling a viewpoint at which the panoramic image or the 360-degree image is displayed on a screen of the user terminal, based on the interaction of the user.

The interaction of the user may include at least one of an input of a text associated with the partial content, an input of a touch or a gesture, a voice input, capturing of an image or an input of the image, and a physical manipulation on the user terminal.

The interaction of the user may be the input of the text associated with the partial content.

The controlling of the partial content or the synthesizing of the second content may include synthesizing the input text with the partial content as at least a portion of a text within the predetermined cut.

The interaction of the user may be the input of the touch or the gesture.

The controlling of the partial content or the synthesizing of the second content may include detecting the input of the touch or the gesture on a portion of an image displayed in correspondence with the partial content, in response to a task associated with the predetermined cut; and visually modifying the portion of the image on which the input of the touch or the gesture is detected.

The controlling of the partial content or the synthesizing of the second content may further include providing guide information about the task or the interaction of the user to be input.

The interaction of the user may be capturing of the image or the input of the image.

The controlling of the partial content or the synthesizing of the second content may include capturing an image of the user using a camera of the user terminal or receiving the image of the user from the user terminal; detecting a face from the captured or received image of the user and creating a character corresponding to the face; and synthesizing the created character with the partial content or at least a portion of the first content.

The character may be created using a candidate that is selected to be similar to a facial portion of the user from among a plurality of candidates for each of portions constituting the face, and may have a style similar to that of another character included in the first content.

The created character may constitute a single layer and may be overlapped or synthesized with a layer included in the predetermined cut.

The partial content may include a cartoon character.

The controlling of the partial content or the synthesizing of the second content may include synthesizing an image captured using a camera of the user terminal as a background of the character.

The controlling of the partial content or the synthesizing of the second content further may include controlling a viewpoint at which the background and the character are displayed on a screen of the user terminal based on the interaction of the user.

A portion of at least one of the background and the character may be displayed on the screen of the user terminal and the displayed portion of the background or the character may be modified based on the interaction of the user.

A display location of a text associated with the character may be changed based on the interaction of the user and a display location of a text associated with a character corresponding to the user may be maintained.

The controlling of the partial content or the synthesizing of the second content may include capturing an image of at least a portion of the user, the background, and the character using the camera of the user terminal; and creating a composite image by replacing the background of the captured image with a background associated with the first content, and by replacing the user with a character corresponding to the user.

The content providing method may further include notifying an insufficiency in the interaction of the user in response to the interaction of the user being insufficient to control the partial content or to create the second content.

According to another aspect of at least one example embodiment, there is provided a content providing apparatus including a communicator configured to receive first content provided from a content providing server; a content creator/controller configured to control partial content of the first content based on an interaction of a user through a user terminal or to synthesize second content created based on the interaction of the user with the partial content, in response to providing the partial content of the first content to the user; and a display configured to display the controlled partial content or composite content in which the second content is synthesized.

According to another aspect of at least one example embodiment, there is provided a content providing method of a user terminal, the method including displaying at least a portion of a panoramic image or a 360-degree image included in partial content of first content in response to providing the partial content of the first content to the user terminal through scrolling, the first content being provided from a content providing server; controlling a viewpoint of the panoramic image or the 360-degree image based on the interaction of the user through the user terminal; and displaying the viewpoint-controlled panoramic image or 360-degree image as a full screen on a screen of the user terminal.

According to some example embodiments, in the case of providing content that includes a plurality of cuts, such as webtoon content, it is possible to synthesize new content with a predetermined cut of the content or to control content included in the predetermined cut based on an interaction with a user, and to provide the synthesized or controlled content, in response to providing the predetermined cut to a user terminal. Accordingly, it is possible to increase interest of the user on the webtoon content.

Also, according to some example embodiments, since a synthesized or controlled content is provided by synthesizing new content with partial content that is a portion of the content or controlling the partial content based on an interaction of a user, it is possible to provide personalized content based on the interaction of the user.

Also, according to some example embodiments, in the case of providing content that includes a plurality of cuts, such as webtoon content, it is possible to synthesize new content created based on an interaction of a user with a predetermined cut of the content. Accordingly, the user may participate into a story of the webtoon content.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein.

Figure 1:
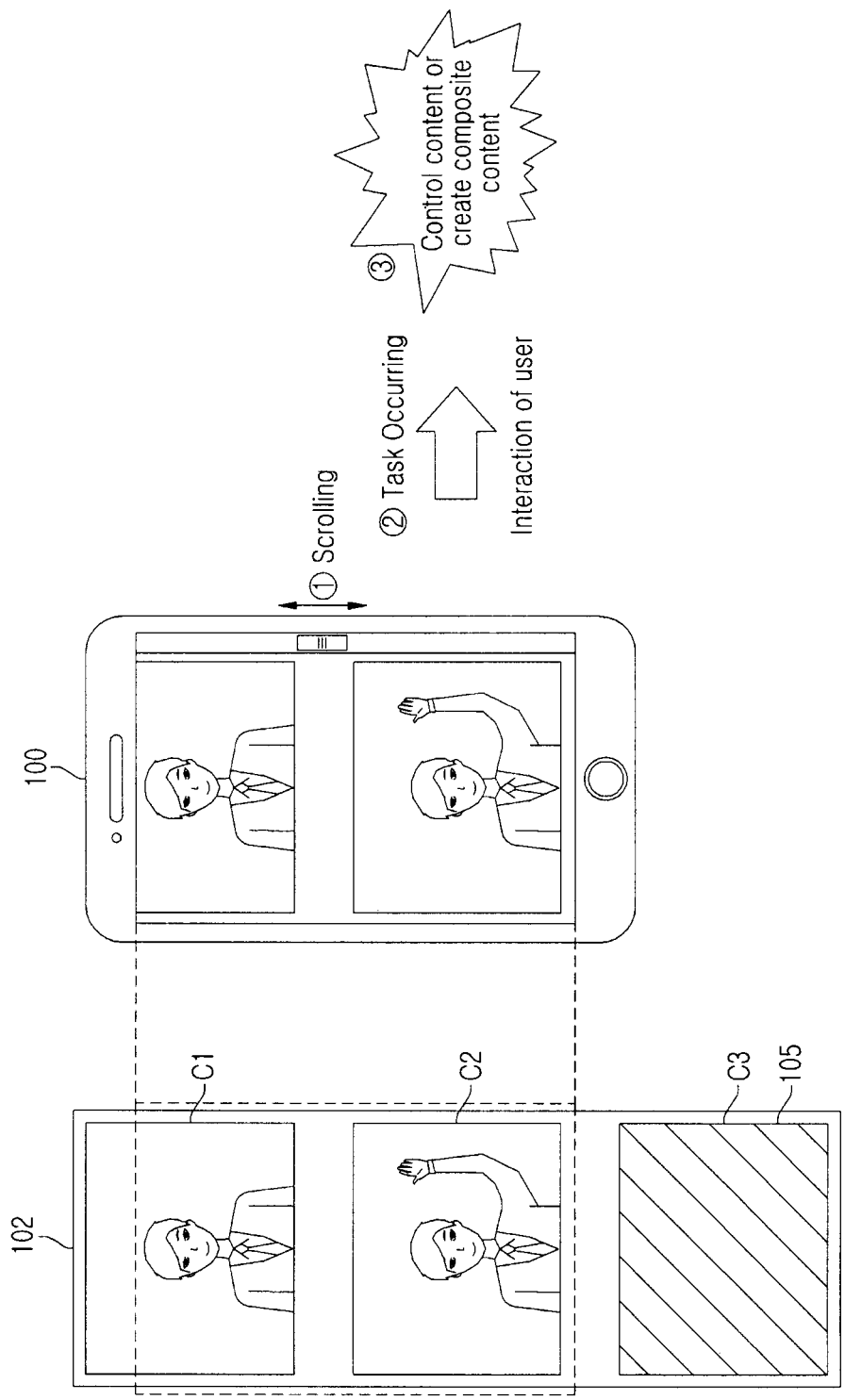
FIG. 1 illustrates an example of providing content, for example, webtoon content, by controlling content or creating composite content based on an interaction of a user according to one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 illustrates an example of providing content, for example, webtoon content, by controlling content or creating composite content based on an interaction of a user according to one Embodiment.

Hereinafter, a method of controlling predetermined partial content 105 of first content 102 provided from a content providing server, based on an interaction of a user through a user terminal 100 or synthesizing second content created based on the interaction of the user with the partial content 105 to provide the partial content 105 to the user terminal 100 is described with reference to FIG. 1.

In the case of providing the first content 102 to the user terminal 100, the partial content 105 or the partial content 105 synthesized with the second content may be displayed on the user terminal 100 at a point in time at which the partial content 105 is displayed on the user terminal 100.

The first content 102 may be content that includes a plurality of cuts C1, C2, . . . , having a semantic correlation when the plurality of cuts C1, C2, . . . , is sequentially displayed. For example, when the plurality of cuts C1, C2, . . . , is sequentially arranged and displayed, the first content 102 may constitute a story in which the cuts C1, C2, . . . , are organically connected. A user that sequentially views the cuts C1, C2, . . . , may understand the story of the first content 102. For example, the first content 102 may correspond to webtoon content. The webtoon content may be a cartoon in a digital content form that is provided through the Internet over a wired/wireless network.

When the cuts C1, C2, . . . , of the first content 102 are provided to the user terminal 100, the user may sequentially view the cuts C1, C2, . . . , by scrolling a screen of the user terminal 100.

When viewing the first content 102 through scrolling, the controlled partial content 105 or the partial content 105 synthesized with the second content may be displayed on the user terminal 100 at a point in time at which a cut C3 corresponding to the partial content 105 is displayed on the screen of the user terminal 100. Here, the cut C3 may be a predetermined (or, alternatively, desired) cut that allows control or synthesizing of the second cut based on the interaction of the user among the plurality of cuts C1, C2 . . . .

For example, at a point in time at which the cut C3 corresponding to the partial content 105 is scrolled, the user terminal 100 may receive a notification requesting a task associated with the partial content 105 to be executed. In response to the notification, the user of the user terminal 100 may input a desired interaction to the user terminal 100. The partial content 105 controlled based on the input interaction or the partial content 105 synthesized with the second content may be displayed on the screen of the user terminal 100 at a point in time at which the partial content 105 should be displayed on the user terminal 100, that is, at a location at which the cut C3 is displayed on the user terminal 100.

Accordingly, the user viewing the first content 102 corresponding to the webtoon content may also view content controlled based on the interaction of the user or the content synthesized with additional content when viewing a specific cut, for example, the cut C3, of the webtoon content.

According to example embodiments, it is possible to enhance interest of a user on webtoon content by controlling content that includes a predetermined (or, alternatively, desired) cut and by providing the synthesized or controlled content. Through this, webtoon content personalized based on an interaction of the user may be provided to the user and the user may participate in the story of the webtoon content.

Herein, the term "first content" may be incomplete webtoon content in that the first content may be provided to the user as webtoon content to be completed based on the interaction of the user.

A method of providing content by controlling the content or creating composite content based on an interaction of a user according to example embodiments is described with reference to FIGS. 2 through 16.

Figure 2:
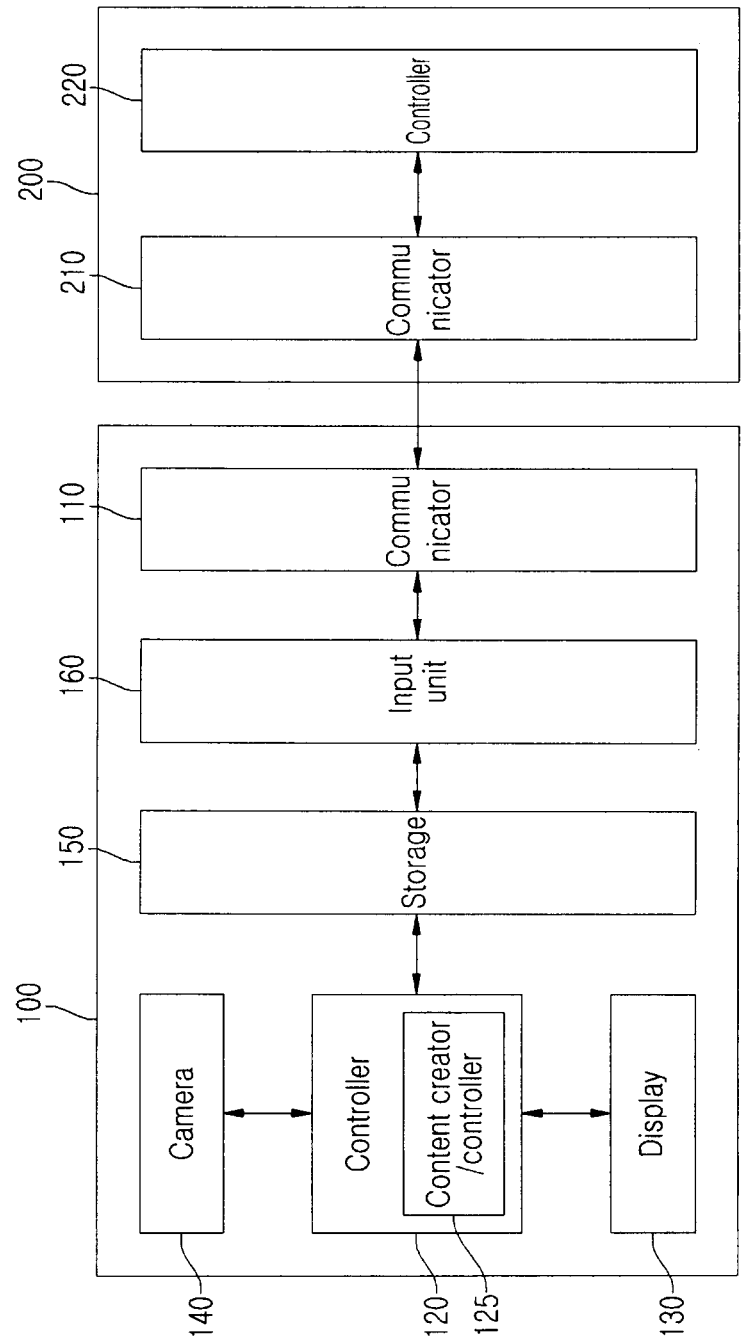
FIG. 2 is a diagram illustrating a configuration of a server and a user terminal used to provide content to a user according to one example embodiment.

FIG. 2 is a diagram illustrating a configuration of a server and a user terminal used to provide content to a user according to at least one example embodiment.

Hereinafter, a content providing server (content providing system) 200 configured to provide the first content 102 of FIG. 1 to the user terminal 100 and the user terminal 100 configured to provide the first content 102 to a user by displaying synthesized or controlled content are further described with reference to FIG. 2.

Referring to FIG. 2, the content providing server 200 may be a service platform that provides webtoon content corresponding to the first content 102 to the user terminal 100 that is a client. The content providing server 200 may be configured to provide the first content 102 to the user terminal 100 through communication with an application installed on the user terminal 100, and may be included in a service platform that provides a webtoon service in a client-server environment.

A communicator 210 may be a device used for communication between the content providing server 200 and another server or the user terminal 100. That is, the communicator 210 may be a hardware module, such as a network interface card, a network interface chip, and a networking interface port of the content providing server 200, configured to transmit and/or receive data and/or information to and/or from the other server or the user terminal 100, or may be a software module, such as a network device driver or a networking program.

A controller 220 may manage components of the content providing server 200, may execute a program or an application to provide the first content 102 to the user terminal 100, and may process an operation required for executing the program or the application and processing data. Also, the controller 220 may be configured to process data received from the other server and the user terminal 100. The controller 220 may be at least one processor of the content providing server 200 or at least one core in the processor.

The user terminal 100 may refer to any type of terminal devices capable of connecting to a website/mobile site associated with the content providing server 200 and installing and executing an application/program for receiving and viewing the first content 102, such as, for example, a personal computer (PC), a laptop computer, a smartphone, a tablet, a wearable device, etc. The user terminal 100 may perform the overall service operations, for example, a service screen configuration, a data input, a data transmission and reception, and a data storage, under control of the website/mobile site or a dedicated application/program.

The user terminal 100 may correspond to a content providing device in that the user terminal 100 provides contents to the user.

The user terminal 100 may include a communicator 110, a controller 120, a display 130, a camera 140, a storage 150 and an input unit 160.

The communicator 110 may be a device used for communication between the user terminal 100 and the server 200 or another user terminal. That is, the communicator 110 may be a hardware module, such as a network interface card, a network interface chip, and a networking interface port of the user terminal 100, configured to transmit/receive data and/or information to/from the server 200 or the other user terminal, or may be a software module, such as a network device driver or a networking program. The communicator 110 may receive the first content 102 provided from the content providing server 200.

The controller 120 may manage components of the user terminal 100 and may execute a program or an application used by the user terminal 100. For example, the controller 120 may install and execute the application/program for receiving and viewing the first content 102 provided from the content providing server 200, and may process an operation required for executing the program or the application and processing data. The controller 120 may be at least one processor of the user terminal 100 or may be at least one core in the processor.

The controller 120 may include a content creator/controller 125 configured to control the partial content 105 based on the interaction of the user through the user terminal 100 or to synthesize second content created based on the interaction of the user with the partial content 105 in response to the partial content 105 of the first content 102 being provided from the content providing server 200 to the user terminal 100. The content creator/controller 125 may be implemented in a processor (or in association with the processor) as a software module and/or hardware module.

A function and an operation of the content creator/controller 125 are further described with reference to FIGS. 3 through 16. The content creator/controller 125 may be configured within at least one processor and thus, a function and an operation of the content creator/controller 125 may be executed by at least one processor.

The display 130 may output the first content 102 received from the content providing server 200 and the synthesized/controlled content 105. Also, the display 130 may output data input from the user through the input unit 160. The display 130 may include a touchscreen. In this case, the display 130 may include a function of an input device (not shown) configured to receive the interaction of the user, for example, a touch input and a gesture input.

For example, the user may view the first content 102 corresponding to the webtoon content by touching a portion on which a scroll is displayed on the display 130 or through swiping (scrolling). When the partial content 105 of the first content 102 is displayed, that is, at a point in time/at a location at which the partial content 105 is displayed on the display 130, the user may input the interaction of the user on a portion of the display 130. Accordingly, the controlled partial content 105 or the partial content 105 synthesized with the second content may be displayed on the display 130.

Also, guide information about a task associated with the partial content 105 or guide information about the interaction of the user to be input may be displayed on the display 130.

The camera 140 may be a device configure to capture an image of the user or other objects. The camera 140 may include an image sensor. The content creator/controller 125 may create an image, for example, a picture and/or a moving picture, of the user or other objects through the camera 140, and may process the created image and may synthesize the created image with the partial content 105 as the second content.

Also, although not illustrated here, the user terminal 100 may include a storage 150 configured to store data or information. The storage 150 may include any type of memory or storage devices. A program or an application executed by the controller 120 and information associated with the program or the application may be stored in the storage 150. For example, the storage 150 may store at least a portion of the partial content 105 controlled based on the interaction of the user or composite content in which the second content is synthesized with the partial content 105. At least a portion of the controlled partial content 105 or the composite content may be stored in the content providing server 200 or an external server.

Although not illustrated here, the user terminal 100 may include a sensing device configured to detect a physical manipulation, for example, a tilt, a shake, and a rotate, on the user terminal 100 as the interaction of the user. The sensing device may include various types of sensors configured to detect the interaction of the user, for example, an acceleration sensor, a gyro sensor, a global positioning system (GPS) sensor, a proximate sensor, and the like.

Although it is described that the content creator/controller 125 performs controlling of the partial content 105 and data processing and operation for synthesizing the second content with the partial content 105, it is provided as an example only. At least a portion of the data processing and operation may be performed by the content providing server 200. For example, the content creator/controller 125 (or its corresponding components) may be implemented in the sever 200. Even in this case, the aforementioned description may be applied.

Also, the data processing and the operation for synthesizing the second content with the partial content 105 may be performed by the application/program installed on the user terminal 100 to provide contents.

The aforementioned description related to technical features of FIG. 1 may be applicable to FIG. 2 and thus, a further description is omitted here.

Figure 3:
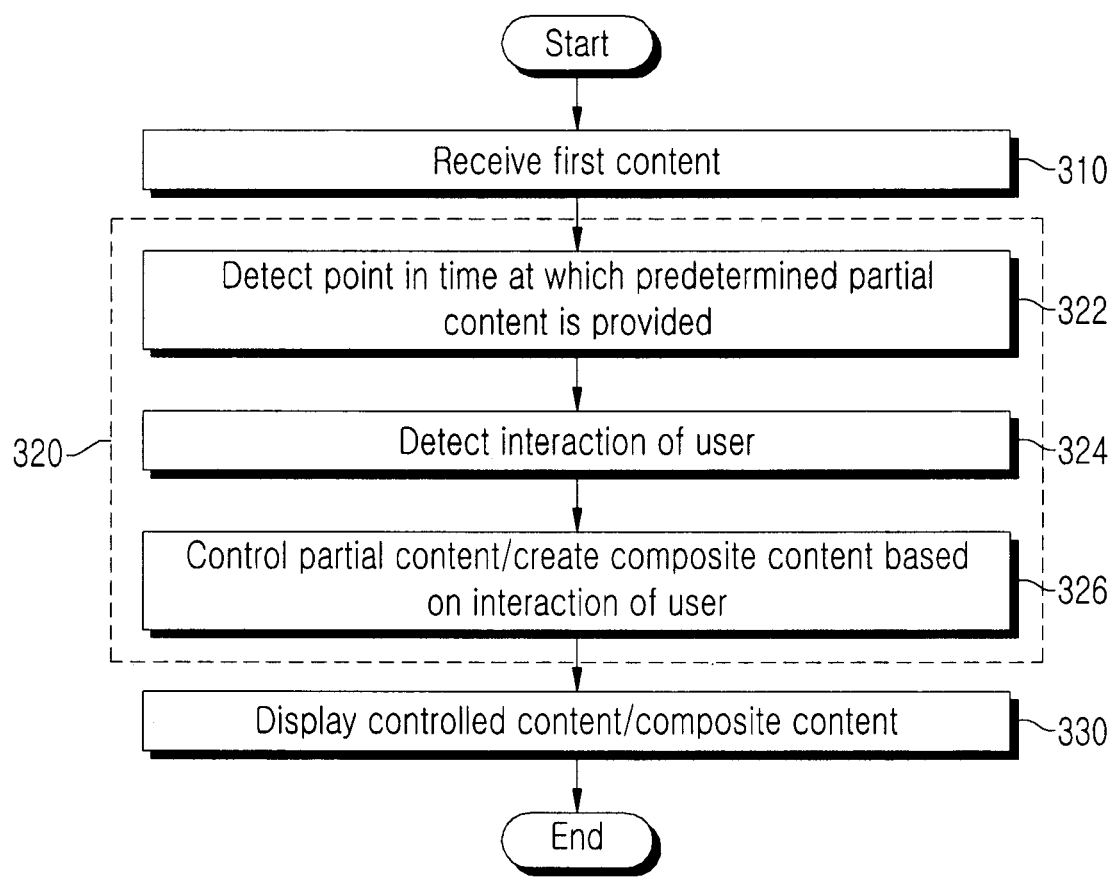
FIG. 3 is a flowchart of a method of providing content controlled or synthesized based on an interaction of a user according to one example embodiment.

FIG. 3 is a flowchart illustrating an example of a method of providing content controlled or synthesized based on an interaction of a user according to one example embodiment.

Referring to FIGS. 1 through 3, in operation 310, the content creator/controller 125 may receive the first content 102 from the content providing server 200 through the communicator 110. The first content 102 may include a plurality of cuts C1, C2, . . . , having a semantic correlation when the plurality of cuts C1, C2, . . . , are sequentially displayed. For example, the first content 102 may be webtoon content. The plurality of contents C1, C2, . . . , may be sequentially displayed through scrolling performed on the display 130 of the user terminal 100. Each of the plurality of cuts C1, C2, . . . , may include at least one layer. A layer included in a cut may correspond to a layer of a background of the corresponding cut, a character included therein, or a text, for example, a speech balloon or lines, included therein. The character may be a personage or a thing included in the webtoon content as a virtual character.

In operation 320, the content creator/controller 125 may control the partial content 105 based on the interaction of the user through the user terminal 100 or may synthesize second content created based on the interaction of the user with the partial content 105 when the user views the first content 102 and the partial content 105 of the first content 102 is provided to the user terminal 100.

Further, operation 320 may include operations 322 through 326.

In operation 322, the content creator/controller 125 may detect a point in time at which the partial content 105 is provided. The point in time at which the partial content 105 is provided may be a point in time at which the partial content 105 starts being displayed on the display 130. For example, a point in time at which the partial content 105 is provided to the user terminal 100 may refer to a point in time at which a predetermined (or, alternatively, desired) cut, for example, the cut C3 corresponding to the partial content 105 starts being displayed at a lower end of the display 130 of the user terminal 100 when the plurality of cuts C1, C2, . . . , included in the first content 102 is sequentially displayed through scrolling on the user terminal 100.

For example, in response to detecting the point in time at which the partial content 105 is provided, the content creator/controller 125 may display the partial content 105 on the display 130. For example, the partial content 105 may be an image corresponding to a predetermined (or, alternatively, desired) cut of the webtoon content determined by a person who initially created the content (i.e., the author of the content). Alternatively, the partial content 105 may include a panoramic image or a 360-degree image. The partial content 105 may be displayed as a full screen on the display 130.

In operation 324, the content creator/controller 125 may detect the interaction of the user associated with the displayed partial content 105. Here, guide information associated with a type or an input location of the interaction of the user to be input may be displayed on the display 130.

In operation 326, the content creator/controller 125 may control the displayed partial content 105 based on the input interaction of the user. For example, the displayed partial content 105 may be visually modified by controlling a viewpoint of the displayed partial content 105, or by adding, deleting, or replacing an object/layer with respect to the displayed partial content 105 or the cut C3. A method of controlling the displayed partial content 105 is further described with reference to FIGS. 4 through 16.

Alternatively, as another example, in response to detecting the point in time at which the partial content 105 is provided, the content creator/controller 125 may request creation of the second content to be synthesized with the partial content 105. For example, the content creator/controller 125 may request creation/input of a text or a character to be synthesized with the partial content 105 corresponding to the predetermined (or, alternatively, desired) cut, for example, the cut C3, of the first content 102 or creation/input of another image.

In operation 324, the content creator/controller 125 may detect the interaction of the user associated with the creation of the second content to be synthesized with the partial content 105.

In operation 326, the content creator/controller 125 may create the second content to be synthesized with the partial content 105 in response to the input of the interaction of the user and may synthesize the created second content with the partial content 105. Here, before synthesizing, the partial content 105 may include only a blank layer and may include only content corresponding to a portion of the intended cut C1 of the first content 102. That is, the cut C3 may be completed by synthesizing the second content with the partial content 105. A method of creating the second content and synthesizing the created second content with the partial content 105 is further described with reference to FIGS. 4 through 16.

In operation 330, the content creator/controller 125 may display, on the display 130, the controlled partial content 105 or the composite content in which the second content is synthesized with the partial content 105 through operation 320. The controlled partial content 105 or the composite content in which the second content is synthesized with the partial content 105 may be displayed as a full screen on the display 130.

The aforementioned interaction of the user may be, for example, at least one of an input of a text associated with the partial content 105, an input of a touch or a gesture associated with the partial content 105, a voice input associated with the partial content 105, capturing of an image or an input of the image, and a physical manipulation (e.g., a tilt, a shake, and a rotate) on the user terminal 100. Also, the interaction of the user may refer to any type of input of the user terminal 100, either through the input unit 160 or the display 130, for controlling the partial content 105 and creating/synthesizing the second content for the partial content 105.

Once the cut C3 of the first content 102 is displayed on the display 130 in operation 330, a subsequent cut may be displayed on the display 130. For example, after the controlled partial content 105 or the composite content in which the second content is synthesized corresponding to the cut C3 is displayed, a subsequent cut of the first content 102 may be displayed from an upper end of the display 130. That is, the subsequent cut may be displayed from an upper end of the screen instead of displaying the previous cut C3 on the screen. Accordingly, viewing the predetermined (or, alternatively, desired) cut, for example, the cut C3 may not be interrupted when the user is viewing the subsequent cut and the user may view the subsequent cut under an optimal condition.

The subsequent cut may include content that is semantically associated with performing a task of, for example, controlling the partial content 105 or synthesizing the second content, in the previous cut C3.

By providing content, such as the webtoon content, to the user through operations 310 through 330, it is possible to enhance interest of the user on the content and to provide content that is personalized and enables the user to participate in the story of the content, instead of unilaterally providing the content to the user.

The aforementioned description related to technical features of FIGS. 1 and 2 may be applicable to FIG. 3 and thus, a further description is omitted here.

Figure 4:
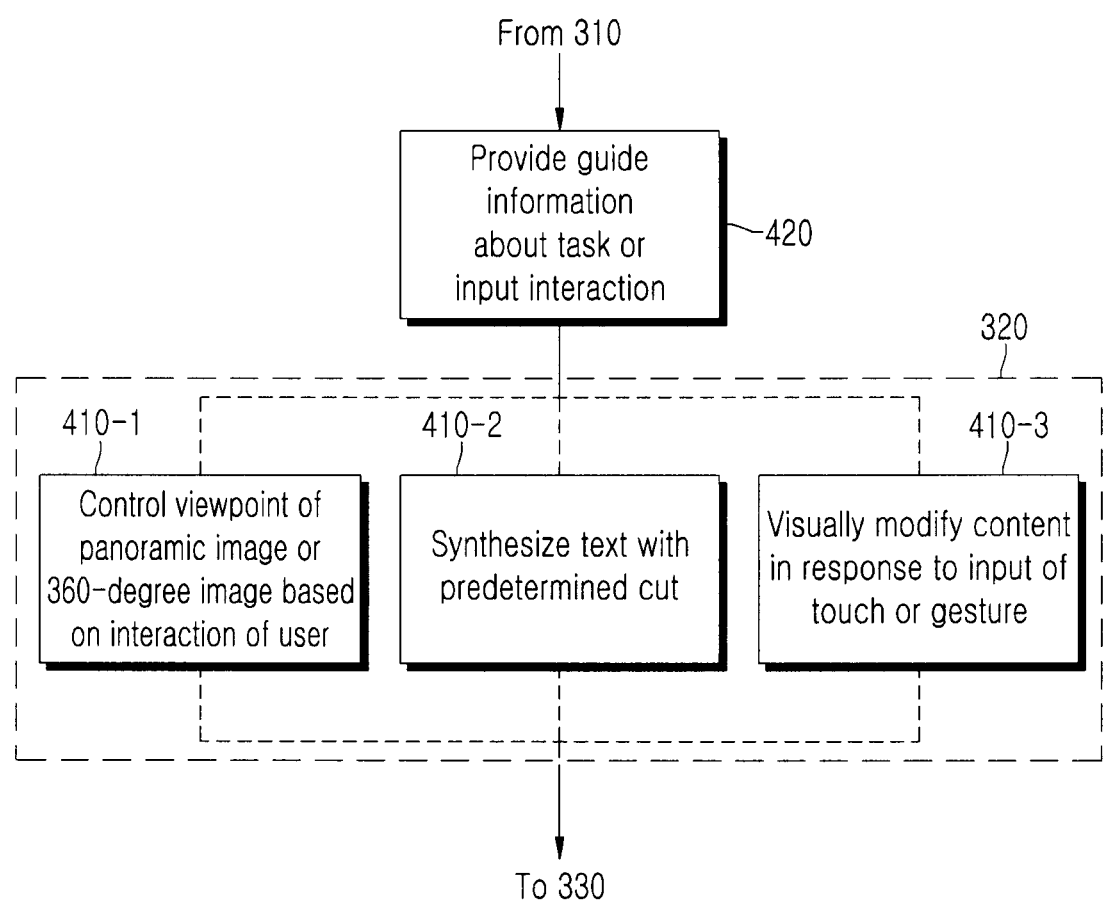
FIG. 4 is a flowchart of a method of controlling predetermined partial content of first content or synthesizing second content with the partial content based on an interaction of a user according to one example embodiment.

FIG. 4 is a flowchart illustrating an example of a method of controlling predetermined (or, alternatively, desired) partial content of first content or synthesizing second content with the partial content based on an interaction of a user according to one example embodiment.

Operation 320 of FIG. 3 is further described with reference to FIG. 4.

For example, the partial content 105 may include a panoramic image or a 360-degree image. The panoramic image or the 360-degree image may be an image corresponding to the cut C3 of the first content 102. In operation 410-1, the content creator/controller 125 may control a viewpoint at which the panoramic image or the 360-degree image is displayed on the display 130 of the user terminal 100 based on the interaction of the user. For example, the user may display a view of the panoramic image or the 360-degree image captured at a different viewpoint on the display 130 by tilting or rotating the user terminal 100. Accordingly, the user may have a sense of space as if the user is present within the cut C3 of the first content 102.

As another example, the interaction of the user may be an input of a text associated with the partial content 105. In operation 410-2, the content creator/controller 125 may synthesize the text with the partial content 105 as the second content based on the interaction of the user. The content creator/controller 125 may synthesize the input text as at least a portion of the text within the cut C3 of the first content 102 corresponding to the partial content 105. For example, if a text input from the user is a "name" of a specific character, the text input from the user may be synthesized with a portion of lines/script corresponding to the name of the specific character with respect to the plurality of cuts C1, C2, . . . , of the first content 102. Accordingly, the user may have a feeling as if the user actually participates into a story of the webtoon content or is a character of the webtoon.

As another example, the interaction of the user may be an input of a touch or a gesture. In operation 410-3, the content creator/controller 125 may detect the input of the touch or the gesture on a portion of an image displayed in correspondence with the partial content 105, and may visually modify the portion of the image on which the input of the touch or the gesture is detected. For example, the displayed partial content 105 or the partial content 105 displayed by adding, deleting, or changing an object/layer with respect to the cut C3 may be visually modified. Accordingly, the user may substantially participate into the story of the webtoon content.

Controlling of the partial content 105 or synthesizing of the second content through operations 410-1 through 410-3 may be performed in response to a task associated with the partial content 105 or the cut C3 of the first content 102. Prior to performing operations 410-1 through 410-3, the content creator/controller 125 may provide guide information about the task to be performed or the interaction of the user to be performed in operation 420. The guide information may be provided in a form corresponding to one of a text, an image, and a symbol, and may be displayed on the display 130 through a pop-up window or in an overlapping form with the displayed partial content 105. The guide information may have a desired level of transparency when the guide information overlaps the partial content 105.

Examples of operations 410-1 through 410-3 are further described with reference to FIGS. 9 through 16.

The aforementioned description related to technical features of FIGS. 1 through 3 may be applicable to FIG. 4 and thus, a further description is omitted here.

Figure 5:
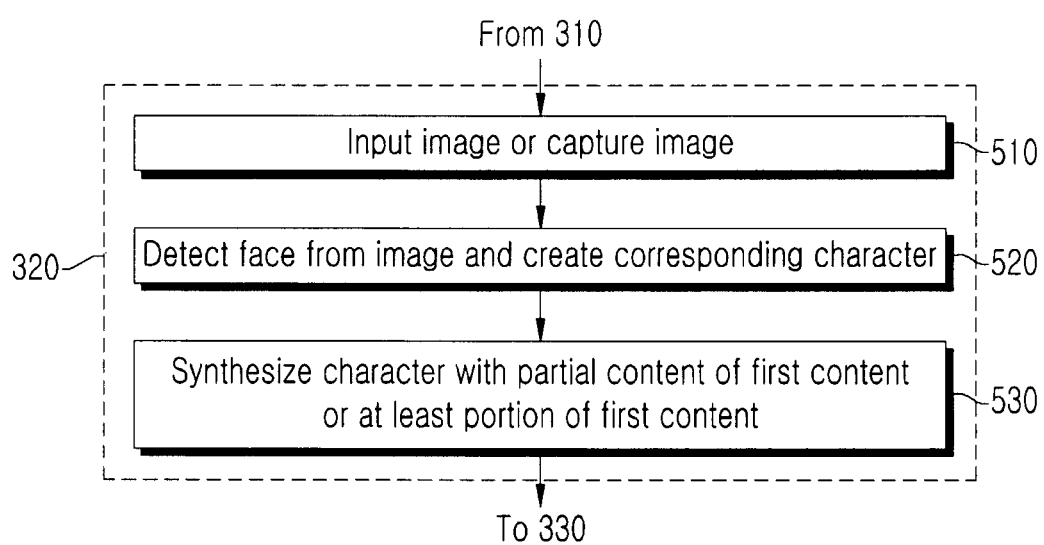
FIG. 5 is a flowchart for creating, as second content, a character corresponding to a user in predetermined partial content of first content and synthesizing the created character with the first content based on an interaction of the user according to one embodiment.

FIG. 5 is a flowchart illustrating an example of creating, as second content, a character corresponding to a user in predetermined (or, alternatively, desired) partial content of first content and synthesizing the created character with the first content based on an interaction of the user according to at least one example embodiment.

Operation 320 is further described with reference to FIG. 5. Operation 320 may include operations 510 through 530 of FIG. 5.

Referring to FIG. 5, the interaction of the user may be capturing of an image or an input of the image. In operation 510, the content creator/controller 125 may capture an image of the user using the camera 140 of the user terminal 100 or may receive the image of the user from the user terminal 100.

In operation 520, the content creator/controller 125 may detect a face from the captured or received image of the user and may create a character corresponding to the face. For example, the character may be created using a candidate that is selected to be similar to a facial portion of the user from among a plurality of candidates of each of portions constituting the detected face. Also, the created character may have a style similar to that of another character included in the first content 102. That is, the created character corresponding to the face of the user may be depicted as a style of painting or drawing same as or similar to that of other characters included in the first content 102 that is the webtoon content.

An artificial intelligence technique, such as a machine learning or a deep learning, may be used to create a character corresponding to the user based on the image of the user. For example, a character recognizable to be same as or similar to a style of painting of a corresponding writer of the first content 102 may be created by applying, to the image of the user, results of the machine learning or deep learning performed on images of the writer of the first content 102. As another example, if a created character has ears, eyes, mouth, and/or nose with similar (or the same) feature of the original characters drawn by the author, the created character can be recognized as if it had been drawn by that author. The character generated to have same features of the original character may be recognized naturally without the sense of difference to the original characters.

At least a portion of data processing or operation to detect the face of the user and to create the character may be performed not by the user terminal 100 but the content providing server 200 or another external server.

In operation 530, the content creator/controller 125 may synthesize the created character with the partial content 105 or at least a portion of the first content 102. For example, the created character may constitute a single layer and the layer including the created character may overlap or synthesize with a layer included in a predetermined (or, alternatively, desired) cut, for example, the cut C3 corresponding to the partial content 105 or at least a portion of cuts C1, C2, . . . , included in the first content 102. Since the created character is configured as the layer, the character may be naturally or smoothly synthesized with the cut C3 or the cuts C1, C2, . . . , included in the first content 102.

Through such character synthesis, the user may have a feeling as if the user substantially participates in the story of the webtoon content or a character of the webtoon. Since a style of painting of the character of the user is the same as or at least similar to that of other characters, the user may not have a sense of difference.

Creating and synthesizing the character through operations 510 through 530 may be performed in response to the task associated with the partial content 105 or the cut C3. Prior to performing operations 510 through 530, the content creator/controller 125 may provide guide information associated with the task to be performed or the interaction of the user to be input.

The aforementioned description related to technical features of FIGS. 1 through 4 may be applicable to FIG. 5 and thus, a further description is omitted here.

Figure 6:
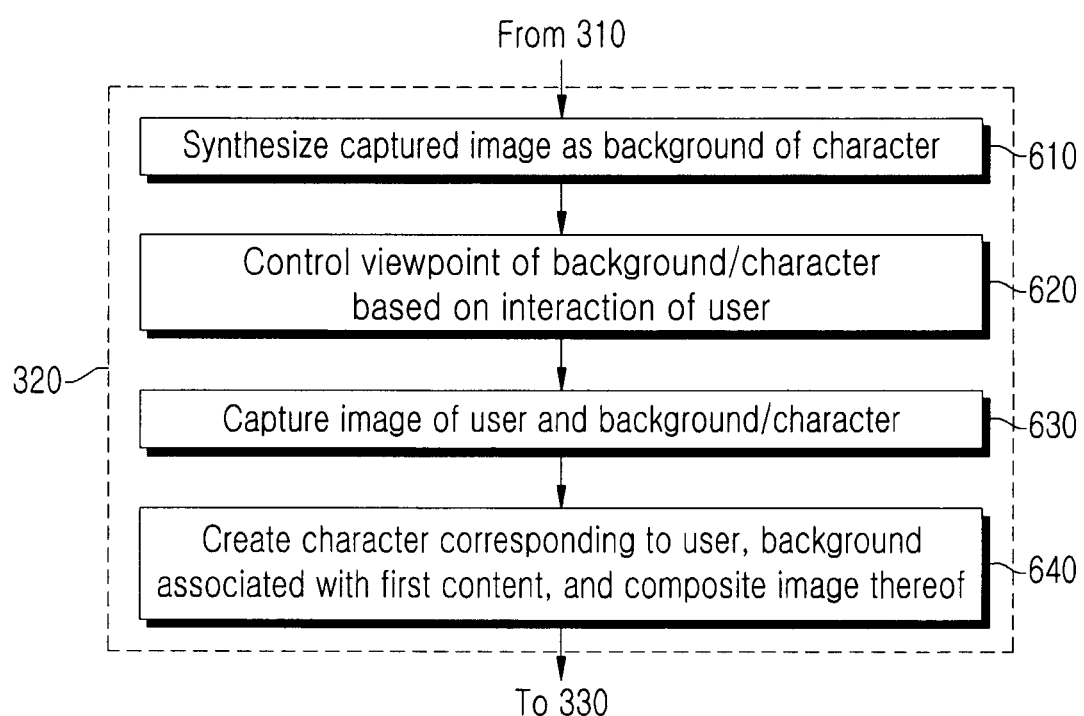
FIG. 6 is a flowchart for synthesizing a captured image with predetermined partial content of first content and controlling the partial content synthesized with the captured image or synthesizing new content, for example, second content with the partial content synthesized with the captured image based on an interaction of a user according to one embodiment.

FIG. 6 is a flowchart illustrating an example of synthesizing a captured image with predetermined (or, alternatively, desired) partial content of first content and controlling the partial content synthesized with the captured image or synthesizing new content, for example, second content with the partial content synthesized with the captured image based on an interaction of a user according to at least one example embodiment.

Operation 320 is further described with reference to FIG. 6. Operation 320 may include operations 610 through 640. Hereinafter, a method of providing the partial content 105 in an augmented reality (AR)/virtual reality (VR) environment is described with reference to operations 610 through 640.

The partial content 105 may include a character. Here, the character may correspond to a character that appears in the webtoon content and may be widely understood as a meaning that includes a specific thing.

Referring to FIG. 6, in operation 610, the content creator/controller 125 may synthesize an image captured by the camera 140 of the user terminal 100 as a background of a character included in the partial content 105. Accordingly, an AR/VR environment may be built in the user terminal 100 as if the character is present in an actual environment in which the user is present. Alternatively, the content creator/controller 125 may synthesize an image captured in real time and an image stored in the user terminal 100 as a background of the character included in the partial content 105.

In operation 620, the content creator/controller 125 may control a viewpoint at which the synthesized background and character are displayed on the display 130 of the user terminal 100 based on the interaction of the user. For example, only a portion of the background and/or the character may be displayed on the display 130 of the user terminal 100 and the displayed portion of the background or the character may be modified based on the interaction of the user.

For example, the content creator/controller 125 may detect a direction in which the user tilts or rotates the user terminal 100 and may modify the portion of the synthesized background and character displayed on the display 130 in the detected direction. For example, the user may change a background to be displayed on the display 130 by changing a viewpoint of the camera 140 and may observe the character at various locations.

In operation 630, the content creator/controller 125 may capture an image of at least a portion of the user and the background and the character that are synthesized in operation 610 using the camera 140.

In operation 640, the content creator/controller 125 may create a composite image by replacing the background of the captured image with a background associated with the first content 102 and by replacing the user with a character corresponding to the user. The character corresponding to the user may be the character created in operation 520 of FIG. 5. The background associated with the first content 102 may be a background of the cut C3 corresponding to the partial content 105. Alternatively, the background associated with the first content 102 may be created by replacing the background of the captured image with a background of a style of painting same as or similar to that of the background of the first content 102 that is webtoon content. Here, the technical feature related to creating the character described with operation 520 may be applied and thus, a further description is omitted here.

Through operations 630 and 640, the user may have a feeling as if the user takes a selfie with the character included in the first content 102. Also, the user may have a feeling as if the user participates into the story of the webtoon content by replacing the user with the character of the user corresponding to the first content 102 and by replacing an actual background with the background associated with the first content 102.

Operations 630 and 640 may be performed if a specific condition is met in operation 620. For example, operations 630 and 640 may be performed if a specific portion of the character is displayed on the display 130 by controlling the viewpoint in operation 620 or if the specific portion of the character is displayed on the display 130 during a desired period of time or more.

Synthesizing the background and creating the composite image in which the character corresponding to the user is synthesized through operations 610 through 640 may be performed in response to the task associated with the partial content 105 or the cut C3. Although not illustrated herein, the content creator/controller 125 may provide on the display 130 guide information associated with the task to be performed or the interaction of the user to be performed prior to performing each of operations 610 through 640.

The aforementioned description related to technical features of FIGS. 1 through 5 may be applicable to FIG. 6 and thus, a further description is omitted here.

Figure 7:
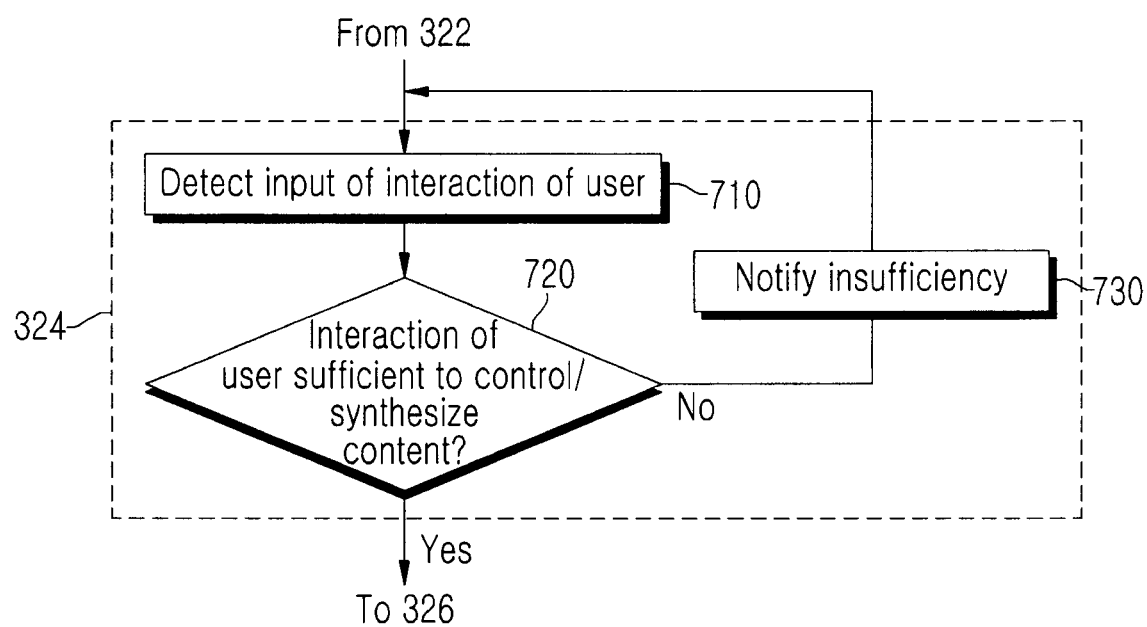
FIG. 7 is a flowchart of a method of notifying an insufficiency in an interaction of a user in response to the interaction of the user being insufficient to control predetermined partial content of first content or to synthesize second content with the partial content according to one embodiment.

FIG. 7 is a flowchart illustrating an example of a method of notifying an insufficiency in an interaction of a user in response to the interaction of the user being insufficient to control predetermined (or, alternatively, desired) partial content of first content or to synthesize second content with the partial content according to at least one example embodiment.

Operation 320 may include operations 710 through 730.

Referring to FIG. 7, in operation 710, the content creator/controller 125 may detect an interaction of a user for controlling the partial content 105 of the first content 102 or synthesizing second content with the partial content 105. In operation 720, the content creator/controller 125 may verify whether the interaction of the user is sufficient to control the partial content 105 or to create the second content. e.g., the size and/or duration of the interaction. In operation 730, when the interaction of the user is verified to be insufficient to control the partial content 105 or to create the second content, the content creator/controller 125 may notify the user of the insufficiency. The notification may be implemented by displaying the insufficiency on the display 130. The notification may be provided to the user in a form of a pop-up window displayed on the display 130, and may include a character included in the first content 102.

The aforementioned description related to technical features of FIGS. 1 through 6 may be applicable to FIG. 7 and thus, a further description is omitted here.

Figure 8:
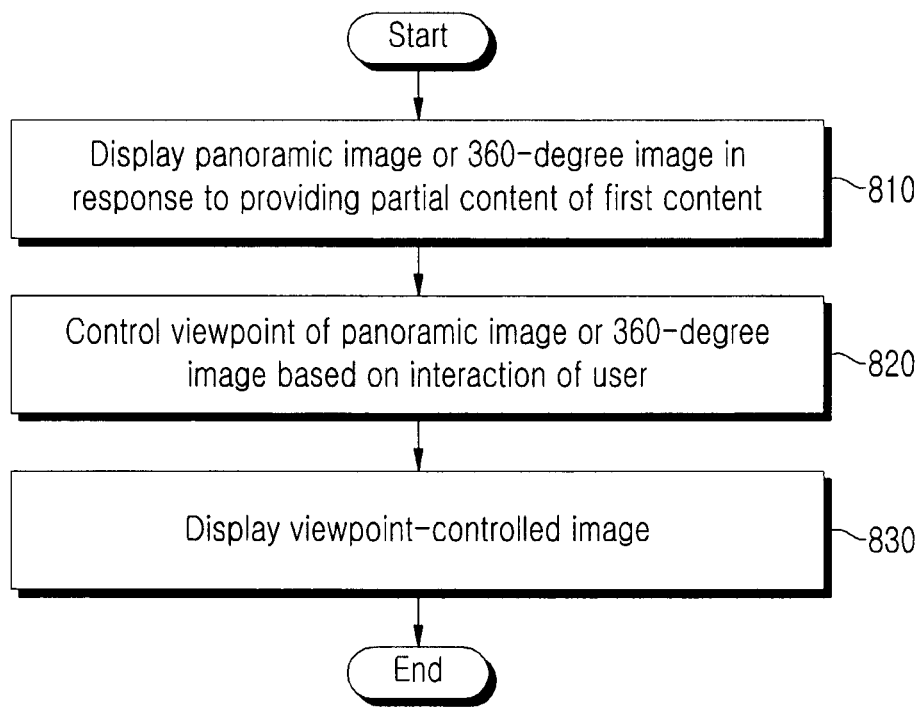
FIG. 8 is a flowchart of a method of controlling a viewpoint of a panoramic image or a 360-degree image as predetermined partial content of first content based on an interaction of a user and providing the viewpoint-controlled content according to one example embodiment.

FIG. 8 is a flowchart illustrating an example of a method of controlling a viewpoint of a panoramic image or a 360-degree image as predetermined (or, alternatively, desired) partial content of first content based on an interaction of a user and providing the viewpoint-controlled content according to at least one example embodiment.

The example embodiments of FIGS. 3 through 7 are further described with reference to FIGS. 810 through 830 of FIG. 8.

Referring to FIG. 8, in operation 810, in response to providing the partial content 105 of the first content 102 to the user terminal 100 through scrolling on the first content 102 provided from the content providing server 200, the content creator/controller 125 may display at least a portion of a panoramic image or a 360-degree image included in the partial content 105 as a full screen on the display 130 of the user terminal 100.

In operation 820, the content creator/controller 125 may control a viewpoint at which the panoramic image or the 360-degree image is displayed on the display 130 of the user terminal 100 based on the interaction of the user through the user terminal 100.

In operation 830, the content creator/controller 125 may display the viewpoint-controlled panoramic image or 360-degree image as a full screen on the display 130 of the user terminal 100. For example, the user may display a view of the panoramic image or the 360-degree image captured at a different viewpoint on the display 130 through an interaction of tilting or rotating the user terminal 100. Accordingly, the user may have a sense of space as if the user is substantially present within the cut C3 of the webtoon content.

The aforementioned description related to technical features of FIGS. 1 through 7 may be applicable to FIG. 8 and thus, a further description is omitted here.

FIGS. 9 through 16 illustrate examples of providing controlled or synthesized content by controlling predetermined (or, alternatively, desired) partial content of first content or synthesizing new content with the partial content based on an interaction of a user according to at least one example embodiment.

Hereinafter, the example embodiments of FIGS. 4 through 8 are further described with reference to FIGS. 9 through 16.

Figure 9:
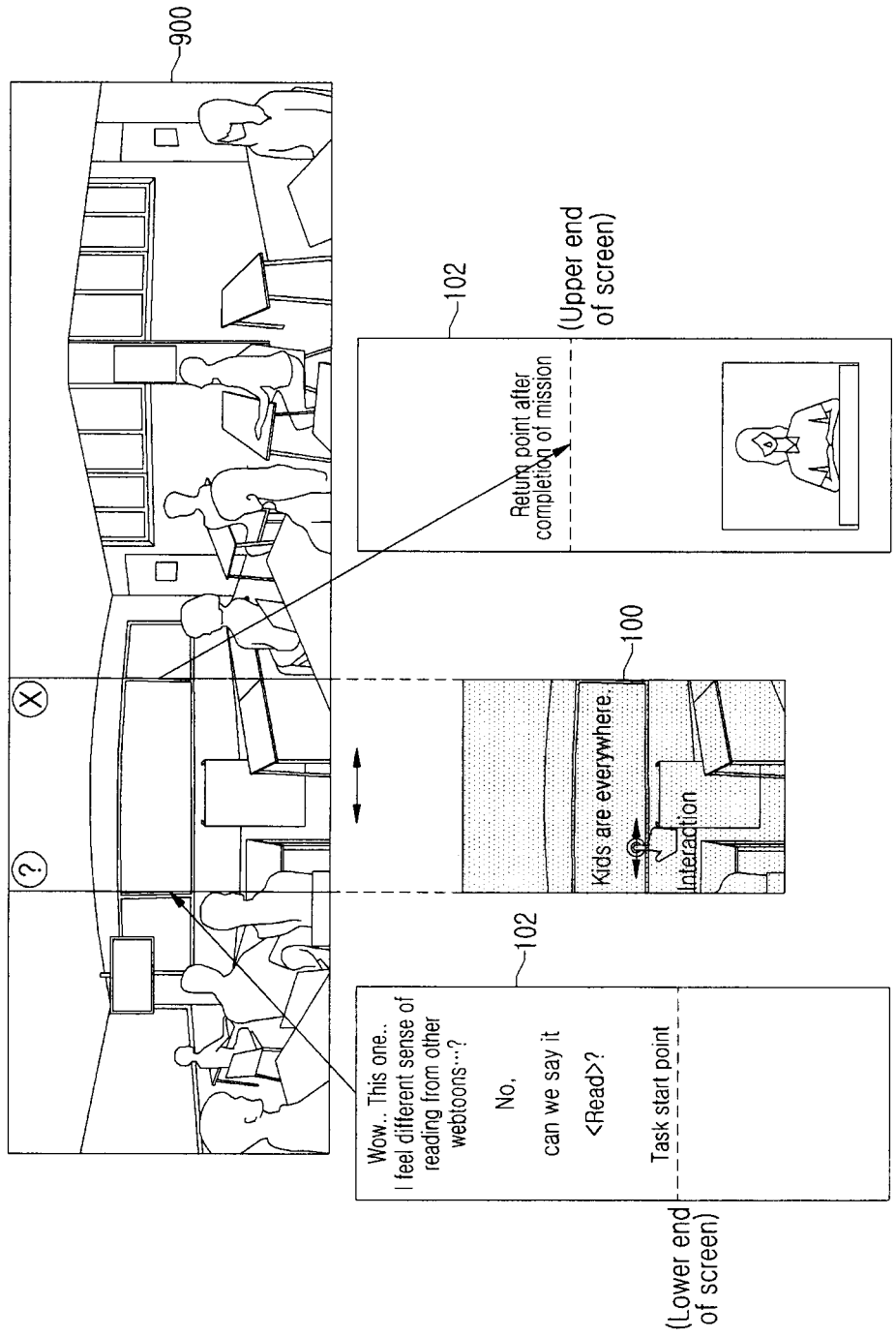
FIGS. 9, 10, 11A-11C, 12, 13A-13C, 14A-14D, 15A-15C and 16A-16C illustrate examples of providing controlled or synthesized content by controlling predetermined partial content of first content or synthesizing new content with the partial content based on an interaction of a user according to at least one example embodiment.

FIG. 9 illustrates an example in which the partial content 105 includes a panoramic image or a 360-degree image as described above with reference to FIGS. 4 through 8.

Referring to FIG. 9, the partial content 105 may include a panoramic image 900. The panoramic image 900 may be an image included in a cut associated with the partial content 105. When the user, while viewing the first content (webtoon content) 102 through scrolling, reaches a desired task start point, that is, when the partial content 105 starts at a lower end of the display (screen) 130, a portion of the panoramic image 900 may be displayed as a full screen on the display 130. Here, in response to an input of a touch or a swipe or an interaction of tilting or rotating the user terminal 100, the content creator/controller 125 may display, on the display 130, another portion of the panoramic image 900 different from the current displaying portion thereof.

Viewing of the partial content 105 may be terminated, if the user terminates viewing the panoramic image 900 by pressing a mark "X" provided on the display 103 or if a desired task is accomplished. The desired task may indicate that a desired period of time has elapsed after starting to view the panoramic image 900 or that a specific portion of the panoramic image 900 is displayed on the display 130.

Once viewing of the partial content 105 is terminated, the subsequent cut of the cut corresponding to the partial content 105 may be displayed on the display 130. Here, an upper end of the subsequent cut may be displayed at an upper end of the display (screen) 130. Accordingly, viewing of the partial content 105 may not interrupt the user viewing the subsequent cut and the user may view the subsequent cut under the optimal condition.

Figure 10:
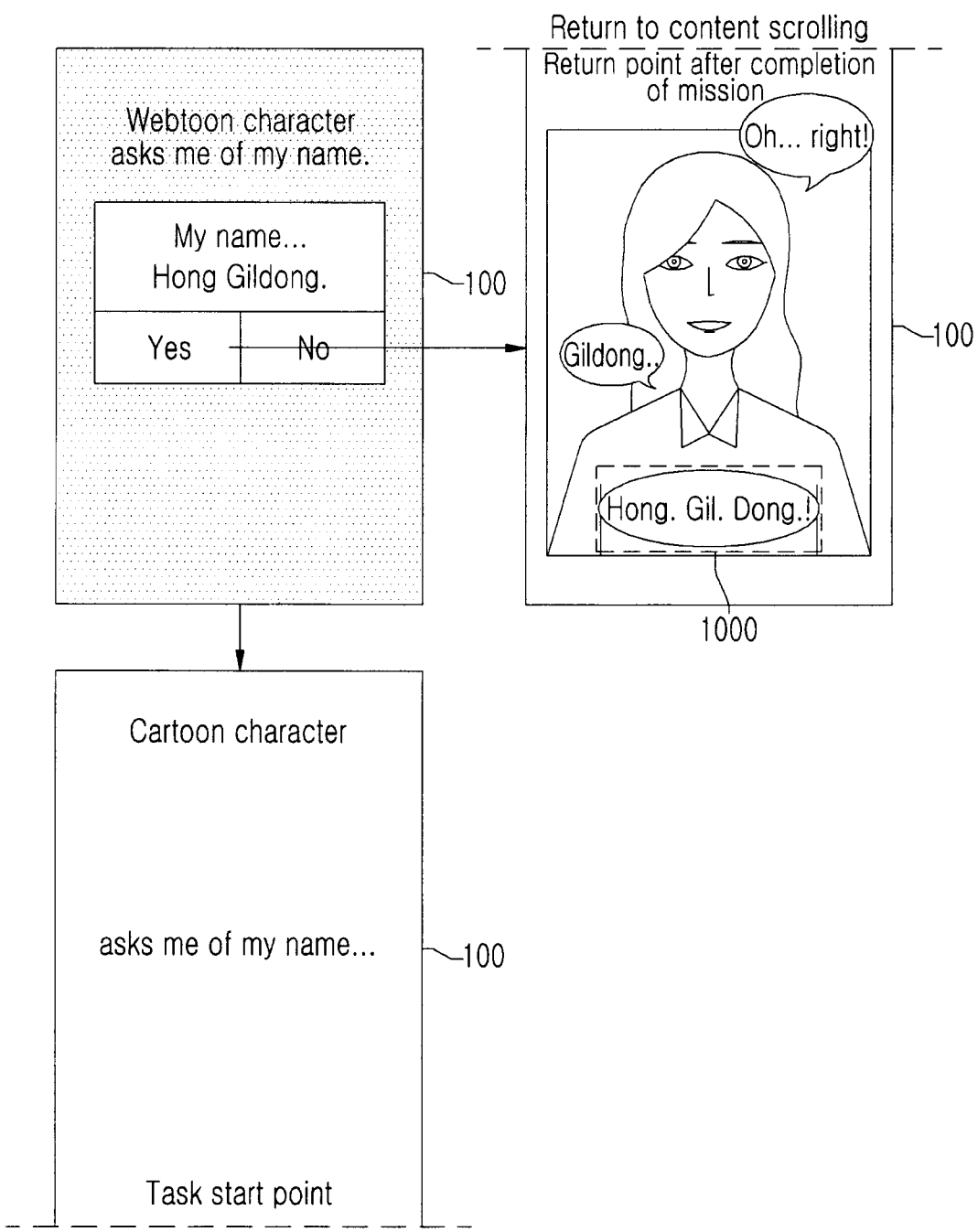

The aforementioned description related to technical features of FIGS. 1 through 8 may be applicable to FIG. 9 and thus, a further description is omitted here FIG. 10 illustrates an example in which a text is synthesized as second content with the partial content 105 as described above with reference to FIG. 4.

Referring to FIG. 10, when the user, while viewing the first content (webtoon content) 102 through scrolling, reaches a desired task start point, that is, when the partial content 105 starts at a lower end of the display (screen) 130, the user may be requested to input a text corresponding to a "name". If the user inputs the text "Hong Gildong" as the name, a message verifying whether the name of the user is "Hong Gildong" may be displayed on the display 130 as shown FIG. 10. When "Hong Gildong" is verified as the name of the user, second content 1000 including "Hong Gildong" corresponding to the name of the user may be synthesized with the partial content 105 and may be displayed on the display 130. Here, the name input from the user may correspond to a "name" of a specific character included in the first content 102. Accordingly, "Hong Gildong (or (Gildong) depending on lines)" may be synthesized with a portion of lines/script that includes the name of the specific character with respect to other cuts included in the first content 102 as well as the cut of the partial content 105. Accordingly, the user may have a feeling as if the user substantially participates into a story of the webtoon content or a character appearing in the webtoon.

Figure 11A:
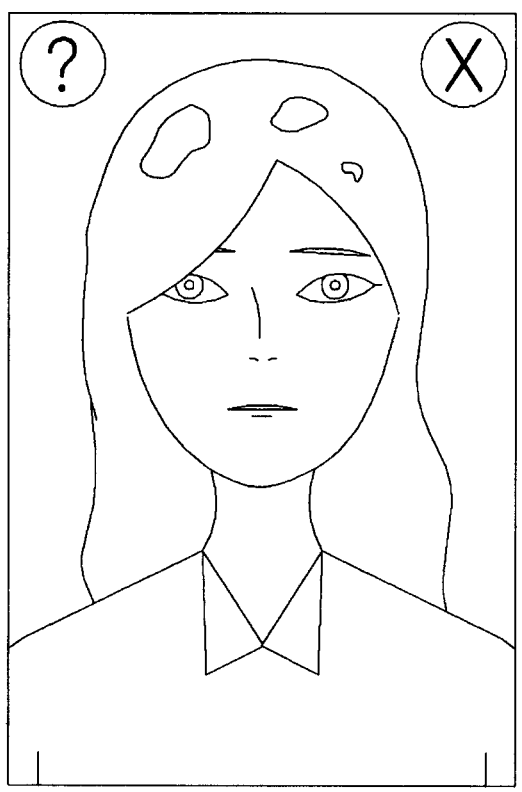
Figure 11B:
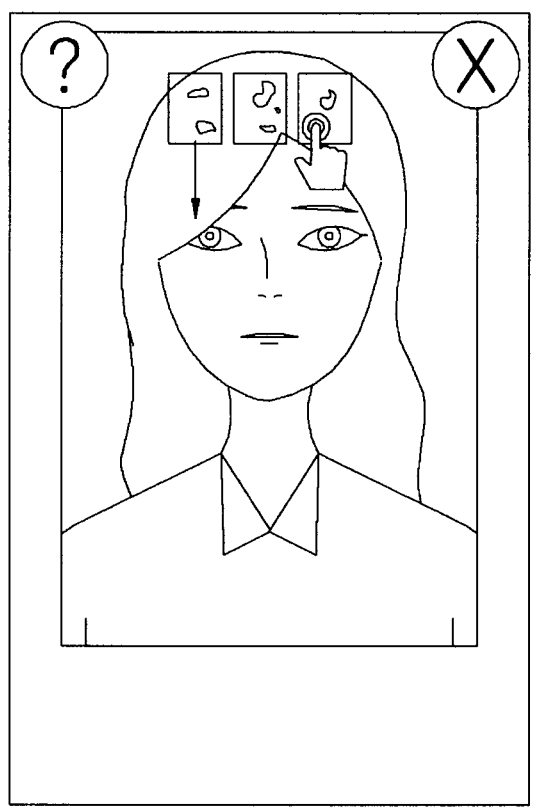
Figure 11C:
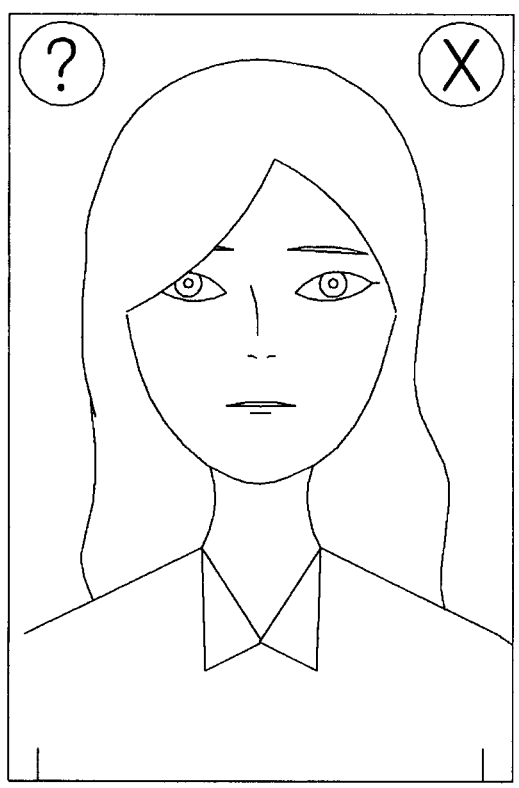
Figure 12:
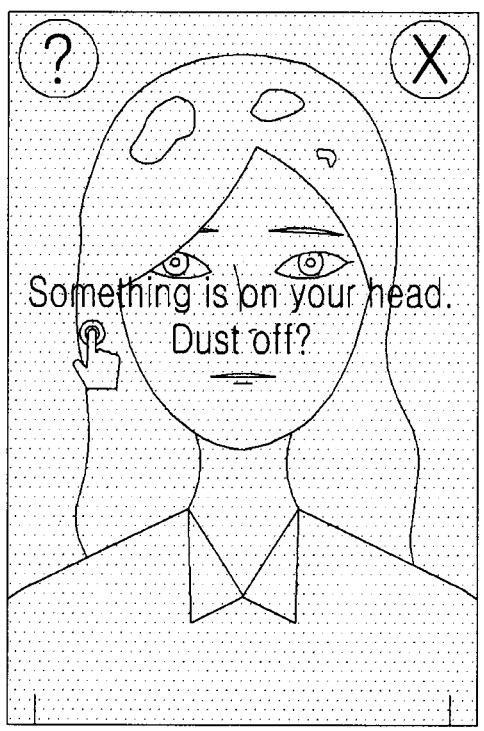

FIGS. 11 and 12 illustrate examples of controlling the partial content 105 in response to an input of a touch or a gesture as an interaction of a user as described above with reference to FIG. 4.

Referring to FIG. 12, when the user, while viewing the first content (webtoon content) 102 through scrolling, reaches a desired task start point, that is, when the partial content 105 starts at a lower end of the display (screen) 130, guide information may be displayed on the display 130. The guide information may include information about a task to be performed and an interaction of the user to be input. Referring to FIG. 11A, a task of removing dust from a head of a character starts, FIG. 11B shows that the dust may be removed from the character by touching the dust and swiping and pushing off the dust, and FIG. 11C shows that viewing of the partial content 105 is terminated when the dust is all removed. A subsequent cut may be displayed on the display 130. Removing of dust may refer to deleting an object corresponding to the dust or deleting a layer including the object corresponding to the dust in a cut corresponding to the partial content 105.

The partial content 105 included in FIG. 11A through FIG. 11C may include a predetermined (or, alternatively, desired) animation effect. Alternatively, the animation effect may occur in response to the interaction of the user.

Various examples of visually representing a character included in the partial content 105 may be configured in a similar manner by inputting a drag, a multi-touch, or a gesture as the interaction of the user.

The character included in the partial content 105 may also be visually represented by inputting a voice as the interaction of the user through a microphone of the user terminal 100. Even in this case, the technical features same as or similar to the aforementioned example may be applied and thus, a further description is omitted.

In addition to the example of FIG. 11, the guide information of FIG. 12 may be displayed on the display 130 in a similar manner, for example, through another task and interaction of the user in other examples.

Figure 13A:
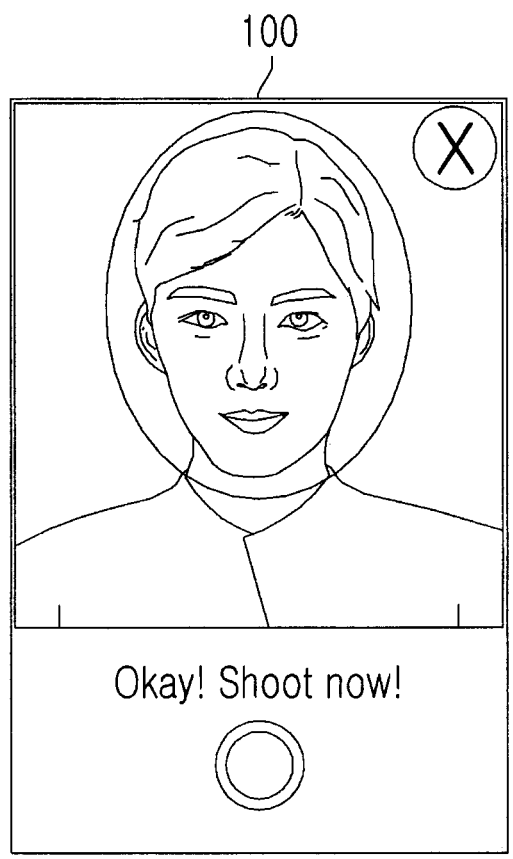
Figure 13B:
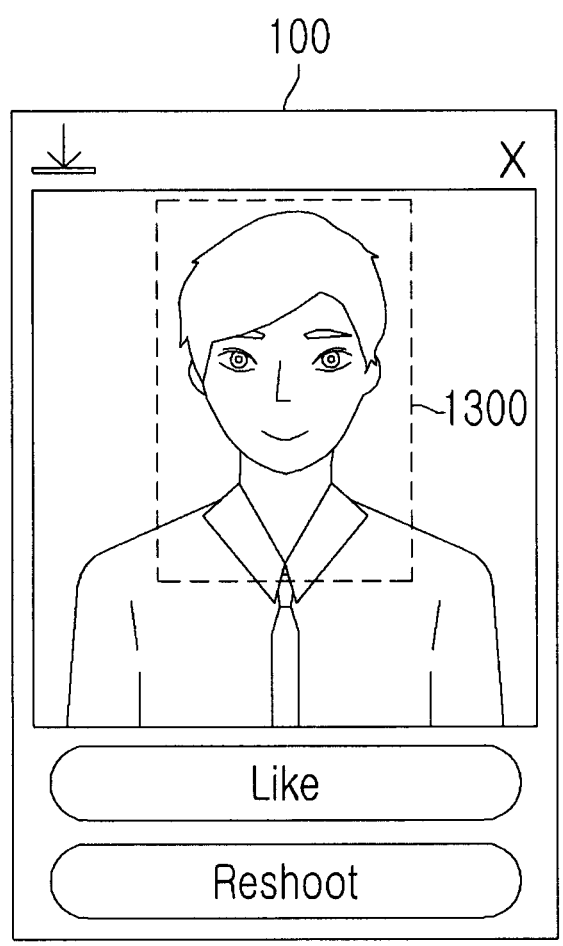
Figure 13C:
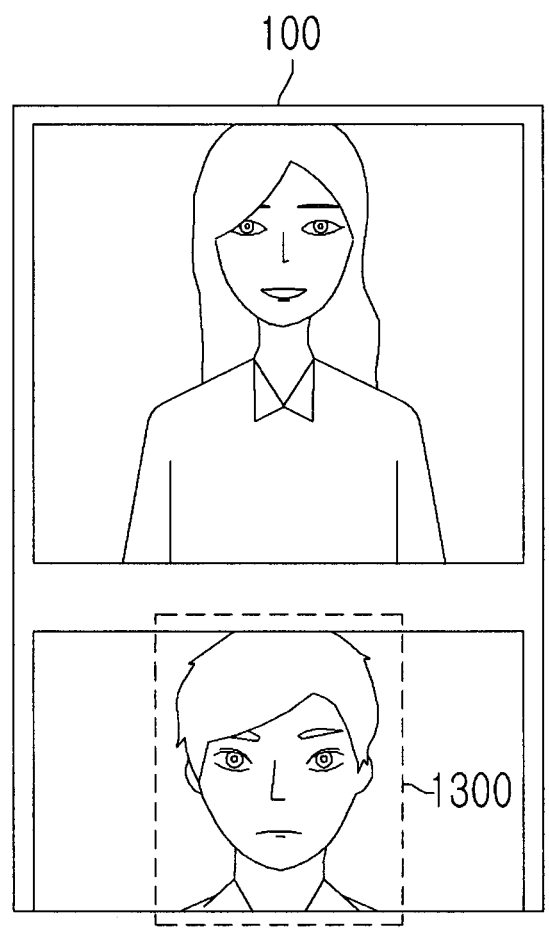

FIGS. 13A-13C illustrate an example of creating a character similar to a face of the user and synthesizing the created character with the first content 102 or the partial content 105 as described above with reference to FIG. 5.

When the user, while viewing the first content (webtoon content) 102 through scrolling, reaches a desired task start point, that is, when the partial content 105 starts at a lower end of the display (screen) 130, the user may be requested to capture an image of a face of the user. FIG. 13A shows that the user captures the image of the face of the user. In this case, the face may be recognized from the captured image. FIG. 13B shows that a character 1300 corresponding to the recognized face of the user is created. The created character may be represented in a style of painting or drawing same as or similar to that of other characters included in the first content 102. FIG. 13C shows that the created character corresponding to the face of the user may be synthesized with the partial content 105. The created character may be synthesized with other cuts of the first content 102 in which the created character appears. Referring to FIG. 13B, if the user does not like the created character, the user may capture again the image of the face of the user to recreate the character.

In response to the request of the user, the created character may be stored in the user terminal 100 or an external server or the content providing server 200.

By synthesizing the character as above, the user may have a feeling as if the user substantially participates into a story of the webtoon content or as if the user is an actual character that appears in the webtoon. Further, since the style of painting or drawing corresponding to the character of the user is the same as or similar to that of other existing characters, the character of the user synthesizes seamlessly into the webtoon content.

FIGS. 14 through 16 illustrate examples of providing the partial content 105 in an AR/VR environment as described above with reference to FIG. 6.

Figure 14A:
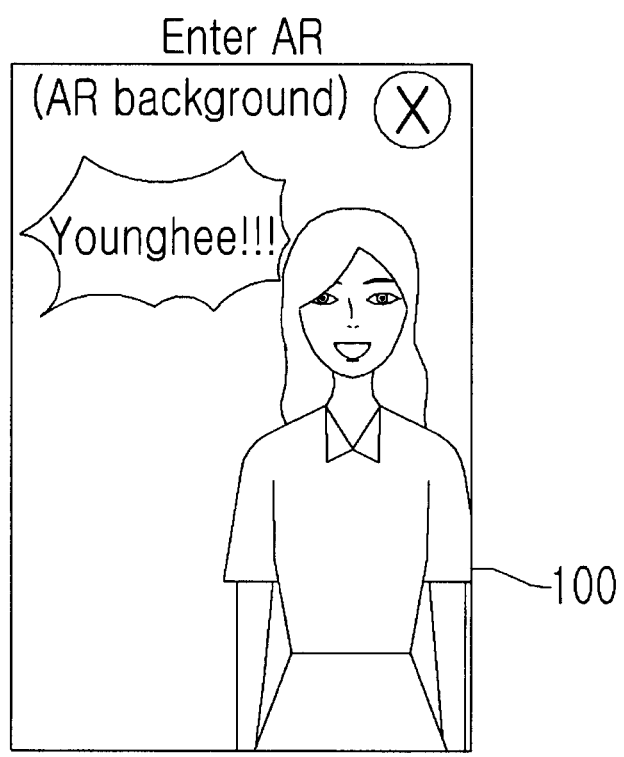
Figure 14B:
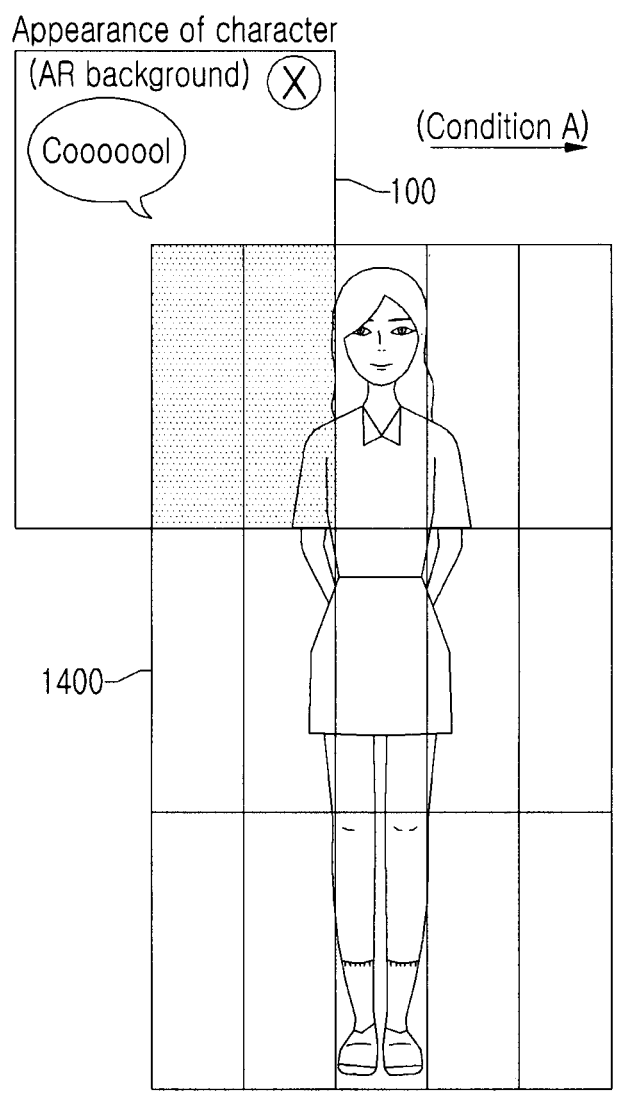
Figure 14C:
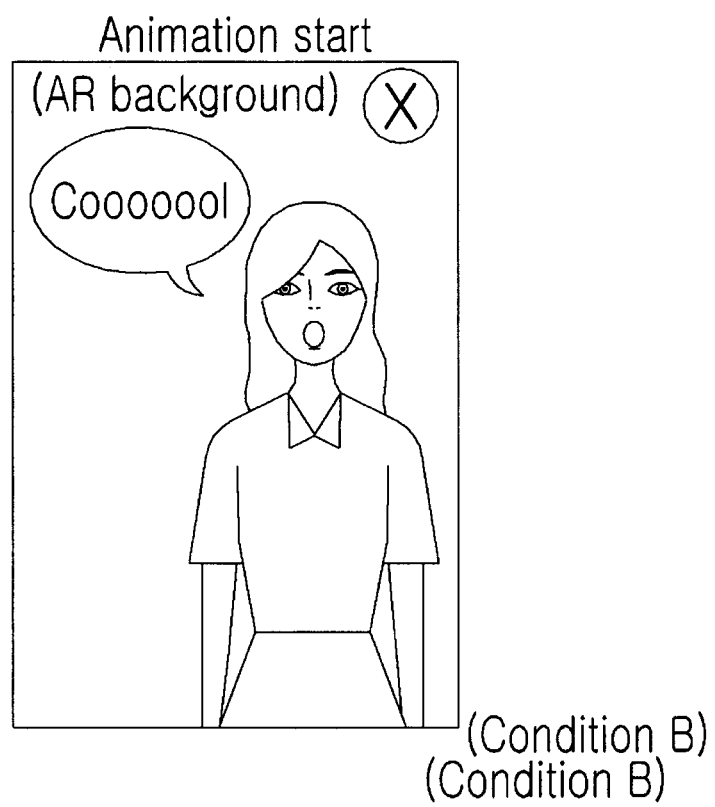
Figure 14D:
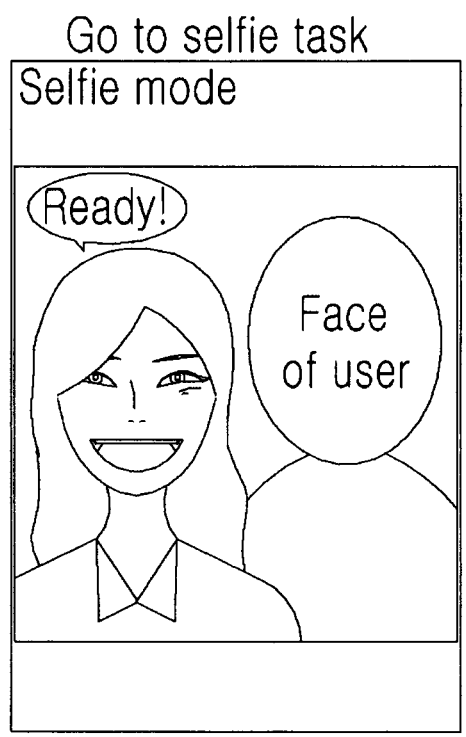

When the user, while viewing the first content (webtoon content) 102, reaches a desired task start point, that is, when the partial content 105 starts at a lower end of the display (screen) 130, the user may be requested to start to take a photo using the camera 140. Referring to FIG. 14A, in response to driving the camera 140, a (real-time) image captured using the camera 140 may be synthesized as a background of a character included in the partial content 105. FIG. 14B shows that, when the background is synthesized, a portion of the character included in the partial content 105 and a portion of the background may be displayed. The content creator/controller 125 may detect a direction in which the user tilts or rotates the user terminal 100 and may change a portion of the synthesized background and character displayed on the display 130 based on the detected direction. For example, the user may change a background displayed on the display 130 by changing a viewpoint of the camera 140 and accordingly, may observe the character at various locations. That is, the user may freely observe the character within a character-and-background range 1400. FIG. 14C shows that, if a condition A is met, an animation effect associated with the character may be played. The condition A may include a case in which at least a preset % of the character is displayed on the display 130, a case in which a specific portion of the character is displayed, or a case in which the specific portion of the character is displayed during at least a specific period of time. FIG. 14D shows that, if a condition B is met, the user may be requested to take a selfie with the character, for example, to perform a selfie task. The condition B may be different from or identical to the condition A. Alternatively, the condition A may need to be initially met in order to satisfy the condition B.

Figure 15A:
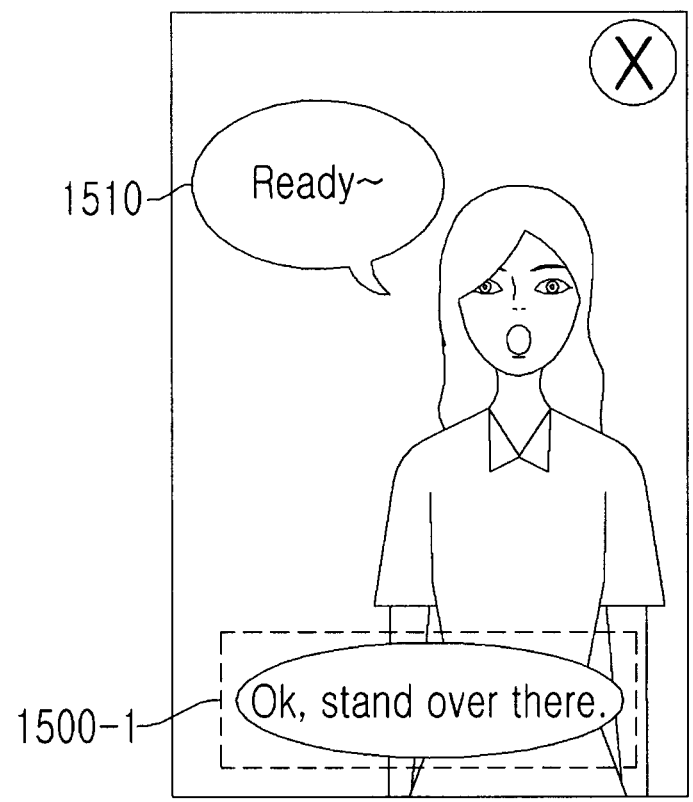
Figure 15B:
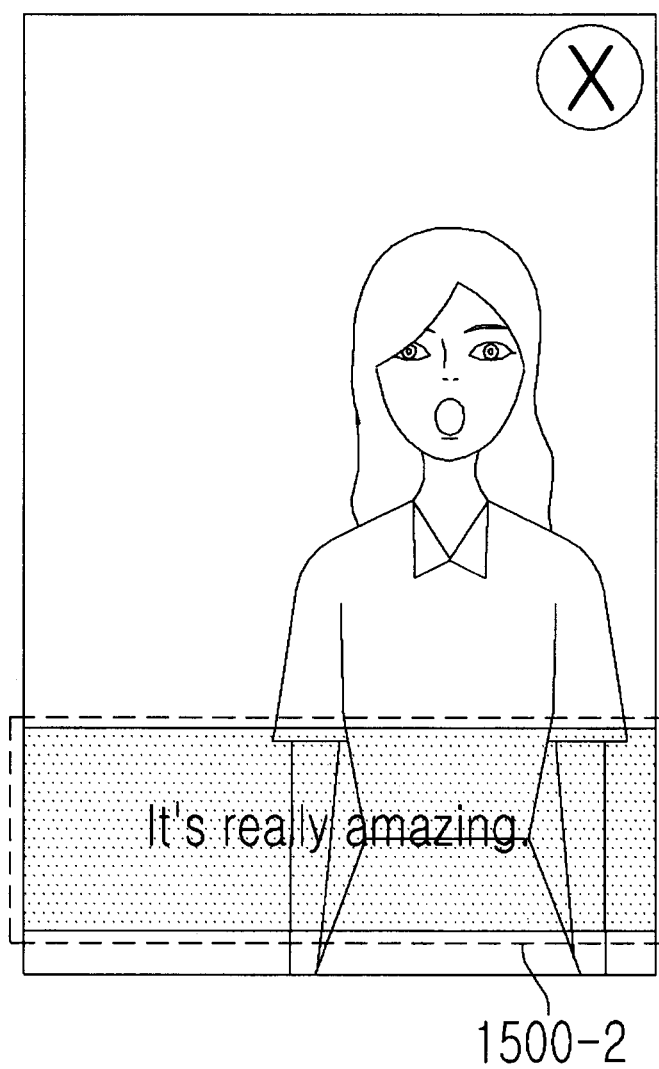
Figure 15C:
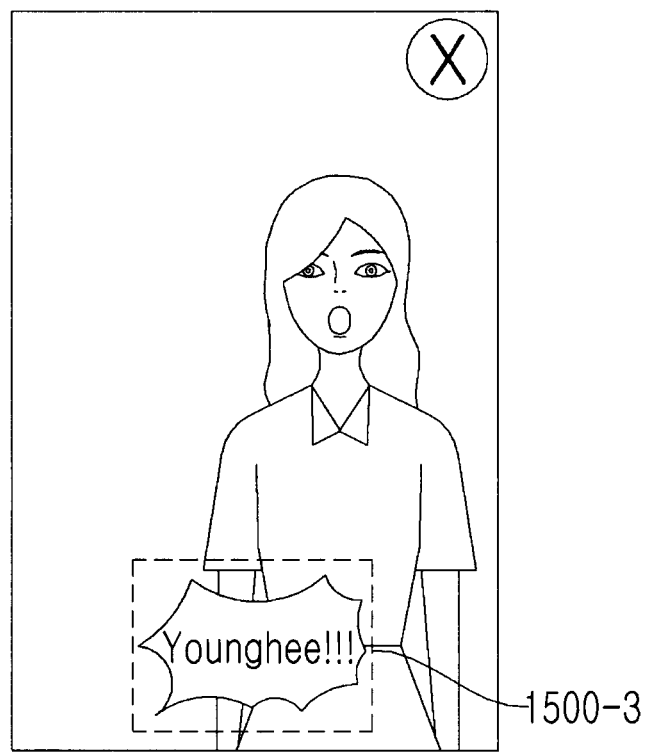

Hereinafter, a method of displaying a text associated with a character in response to a change in a camera viewpoint as shown in FIG. 14B is described with reference to FIG. 15. A display location of a text, for example, a speech balloon, associated with the character may be changed based on the interaction of the user. A display location of a text associated with the character corresponding to the user may be maintained without being changed. Referring to FIGS. 15A, 15B and 15C, display locations of texts 1500-1, 1500-2, and 1500-3 associated with the character corresponding to the user may be maintained at a lower end of the display 130. A text of a character not corresponding to the user may be displayed on the display 130 so that the word end or tail of a speech balloon may face a head location of the corresponding character. For example, if the character is located at a right upper end outside the display 130, the text associated with the character may be displayed at a right upper end of the display 130 and the word end or tail may be displayed toward the right upper end of the display 130.

Figure 16A:
Figure 16B:
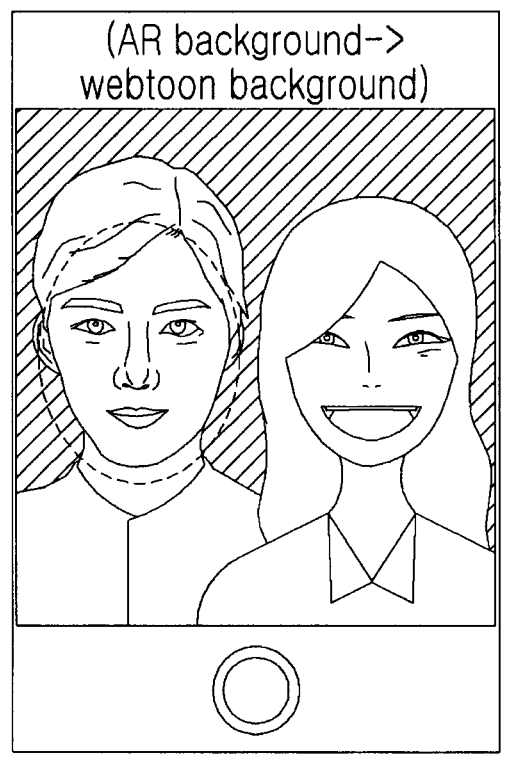
Figure 16C:
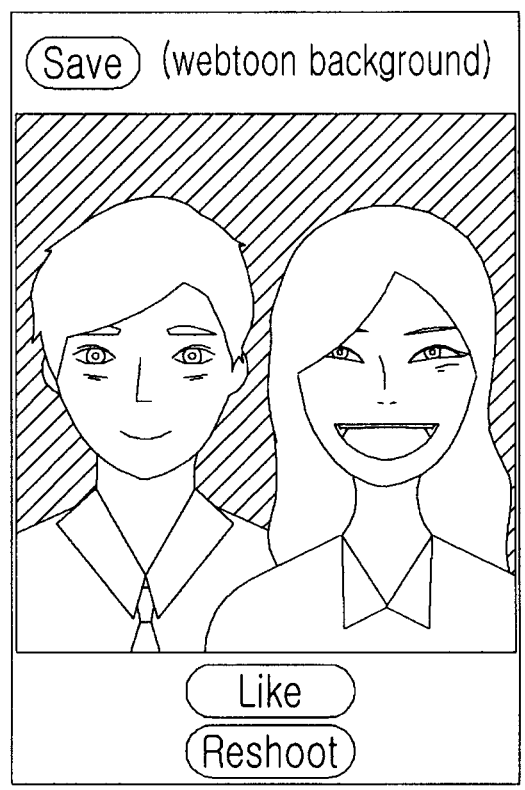

The selfie task shown in FIG. 14D is described with reference to FIG. 16. FIG. 16A shows that the user may capture an image that includes the user and the background and character, using the camera 140. The content creator/controller 125 may replace a background of the captured image with a background corresponding to the webtoon content as shown in FIG. 16B, and may replace a face of the user of the captured image with a character associated with the webtoon content as shown in FIG. 16C. Replacing the background and the character is described above with reference to FIG. 6 and thus, a further description is omitted. If the selfie is taken as shown in FIG. 16C, the completed selfie may be stored in the user terminal 100 or the external server or the content providing server 200 in response to a request of the user.

In the aforementioned example embodiments, a right to access an album or use the camera 140 may need to be allowed to input an image or take a photo. Otherwise, the content creator/controller 125 may request the user to be granted with the right by displaying, for example, a pop-up window on the display 130.

The aforementioned description related to technical features of FIGS. 1 through 8 may be applicable to FIGS. 9 through 16 and thus, a further description is omitted here.

The apparatuses and/or devices described herein may be implemented using hardware components and/or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A content providing method of a user terminal of a user of the content, the method comprising:
displaying first content provided from a content providing server as a plurality of sequential cuts of the first content on a screen of the user terminal;
displaying partial content included in the first content on the screen of the user terminal as one of the plurality of sequential cuts by scrolling the plurality of sequential cuts of the first content on the screen of the user terminal;
providing a notification to the user, wherein the notification includes a task associated with the partial content that may be executed by the user, wherein the providing of the notification is triggered at a point in time at which the partial content is displayed on the screen of the user terminal;
synthesizing, by a processor, second content with the partial content, wherein the second content is created based on the execution of the task by the user; and
displaying composite content in which the second content is synthesized with the partial content,
wherein the execution of the task by the user includes capturing of an image or an input of an image,
wherein the synthesizing of the second content comprises:
capturing a user image of the user using a camera of the user terminal or receiving a user image of the user from the user terminal;
detecting a face from the captured or received user image of the user and creating a character reflecting features of the face, wherein the created character has a style similar to that of another character included in the first content; and
synthesizing the created character with the partial content or at least a portion of the first content, and
wherein the displaying of the composite content comprises displaying a cut of the plurality of sequential cuts in which the created character as the second content is synthesized with the partial content or the at least a portion of the first content.

2. The method of claim 1, wherein each of the plurality of sequential cuts includes at least one layer, and
the partial content is a predetermined cut in the first content that allows control of the partial content by the user or synthesizing of the second content with the partial content based on an execution of at least one task by the user.

3. The method of claim 2, wherein,
a point in time at which the partial content is provided to the user terminal is a point in time at which the predetermined cut starts to be displayed at a lower end of the screen of the user terminal, and
a subsequent cut of the first content is displayed from an upper end of the screen after the controlled partial content or the composite content in which the second content is synthesized corresponding to the predetermined cut is displayed.

4. The method of claim 1, wherein the composite content in which the second content is synthesized is displayed as a full screen on the screen of the user terminal.

5. The method of claim 1, wherein at least a portion of the composite content is stored in the user terminal or the content providing server.

6. The method of claim 1, wherein the partial content includes a panoramic image or a 360-degree image, and
the method further comprises:
controlling a viewpoint at which the panoramic image or the 360-degree image is displayed on the screen of the user terminal, based on an execution of at least one task by the user.

7. The method of claim 2, wherein the execution of the at least one task by the user includes at least one of an input of a text associated with the partial content, an input of a touch or a gesture, a voice input, capturing of the image or the input of the image, and a physical manipulation on the user terminal.

8. The method of claim 7, wherein the execution of the at least one task by the user is the input of the text associated with the partial content, and
the synthesizing of the second content comprises synthesizing the input text with the partial content as at least a portion of a text within the predetermined cut.

9. The method of claim 7, wherein the execution of the at least one task by the user includes the input of the touch or the gesture, and
the method further comprises:
detecting the input of the touch or the gesture on a portion of an image displayed in correspondence with the partial content, in response to a task associated with the predetermined cut; and
visually modifying the portion of the image on which the input of the touch or the gesture is detected.

10. The method of claim 9, wherein the method further comprises:
providing guide information about a task to execute by the user.

11. The method of claim 1, wherein the character is created using a candidate that is selected to be similar to a facial portion of the user from among a plurality of candidates for each of portions constituting the face, and has a style similar to that of another character included in the first content.

12. The method of claim 1, wherein the created character constitutes a single layer and is overlapped or synthesized with a layer included in the predetermined cut.

13. The method of claim 1, wherein the partial content includes another character, and
the synthesizing of the second content comprises synthesizing a background image captured using the camera of the user terminal as a background of said another character.

14. The method of claim 13, further comprising:
controlling a viewpoint at which the background and said another character are displayed on the screen of the user terminal based on an execution of at least one task by the user, and
a portion of at least one of the background and said another character is displayed on the screen of the user terminal,
the displayed portion of the background or said another character is modified based on the execution of said at least one task, and
a display location of a text associated with said another character is changed based on the execution of said at least one task by the user and a display location of a text associated with the character corresponding to the user is maintained.

15. The method of claim 13, further comprising:
capturing at least a portion of the user, a background image, and said another character using the camera of the user terminal; and
creating a composite image by replacing the background image with a background associated with the first content and by replacing the user with the character corresponding to the user.

16. The method of claim 1, further comprising:
notifying an insufficiency in the execution of the task by the user in response to the execution of the task by the user being insufficient to control the partial content or to create the second content.

17. A content providing apparatus for displaying content to a user of the content, the apparatus comprising:
a communicator configured to receive a plurality of sequential cuts of first content provided from a content providing server;
a processor in communication with the communicator and including a content creator/controller function configured to provide partial content included in the first content as one of the plurality of sequential cuts to the user by scrolling the plurality of sequential cuts of the first content on a screen of a user terminal, and control the partial content of the first content based on a notification to the user that is triggered at a point in time at which the partial content is provided to the user terminal, wherein the notification includes a task associated with the partial content that may be executed by the user, to synthesize second content with the partial content through the user input device, wherein the second content is created based on the execution of the task by the user; and
a display configured to display composite content in which the second content is synthesized with the partial content,
wherein the execution of the task by the user is capturing of an image or an input of an image,
wherein the synthesizing of the second content comprises:
capturing an image of the user using a camera of the user terminal or receiving the image of the user from the user terminal;
detecting a face from the captured or received image of the user and creating a character reflecting features of the face, wherein the created character has a style similar to that of another character included in the first content; and
synthesizing the created character with the partial content or at least a portion of the first content, and
wherein the displaying of the composite content comprises displaying a cut of the plurality of sequential cuts in which the created character as the second content is synthesized with the partial content or the at least a portion of the first content.

18. A content providing method of a user terminal of a user of the content, the method comprising:
displaying first content provided from a content providing server as a plurality of sequential cuts of the first content on a screen of the user terminal;
displaying partial content included in the first content on the screen of the user terminal as one of the plurality of sequential cuts by scrolling the plurality of sequential cuts of the first content on the screen of the user terminal;
providing a notification to the user that is triggered at a point in time at which the partial content is displayed on the screen of the user terminal, wherein the notification includes a task associated with the partial content that may be executed by the user;
synthesizing, by a processor, second content with the partial content, wherein the second content is created based on the execution of the task by the user;
displaying on the screen of the user terminal at least a portion of a panoramic image or a 360-degree image included in the partial content;
controlling a viewpoint of the panoramic image or the 360-degree image based on the execution of the task by the user through the user terminal; and
displaying composite content including the viewpoint-controlled panoramic image or 360-degree image included in the partial content, as a full screen on the screen of the user terminal, and
wherein the execution of the task by the user is capturing of an image or an input of an image,
wherein the synthesizing of the second content comprises:
capturing an image of the user using a camera of the user terminal or receiving the image of the user from the user terminal;
detecting a face from the captured or received image of the user and creating a character reflecting features of the face, wherein the created character has a style similar to that of another character included in the first content; and
synthesizing the created character with the partial content or at least a portion of the first content, and
wherein the displaying of the composite content comprises displaying a cut of the plurality of sequential cuts in which the created character as the second content is synthesized with the partial content or the at least a portion of the first content.

* * * * *